United States Patent [19]
Larson et al.

[11] Patent Number: 5,563,727
[45] Date of Patent: Oct. 8, 1996

[54] HIGH APERTURE AMLCD WITH NONPARALLEL ALIGNMENT OF ADDRESSING LINES TO THE PIXEL EDGES OR WITH DISTRIBUTED ANALOG PROCESSING AT THE PIXEL LEVEL

[75] Inventors: Brent D. Larson, Cave Creek; Roger K. Ellis, Glendale, both of Ariz.

[73] Assignee: Honeywell Inc., Minneapolis, Minn.

[21] Appl. No.: 268,590

[22] Filed: Jun. 30, 1994

[51] Int. Cl.$^6$ .......................... G02F 1/136; G02F 1/1343; G09G 3/36
[52] U.S. Cl. ................. 359/54; 359/59; 359/87; 345/90
[58] Field of Search .................. 359/59, 54, 53, 359/88, 87; 345/90

[56] References Cited

U.S. PATENT DOCUMENTS

| | | | |
|---|---|---|---|
| 4,842,373 | 6/1989 | Tomofuji et al. | 359/88 |
| 4,908,613 | 3/1990 | Green | 345/90 |
| 5,050,965 | 9/1991 | Conner et al. | 359/53 |
| 5,124,818 | 6/1992 | Conner et al. | 359/53 |
| 5,146,356 | 9/1992 | Carlson | 359/59 |
| 5,162,931 | 11/1992 | Holmberg | 359/54 |
| 5,193,018 | 3/1993 | Wu | 359/59 |
| 5,307,189 | 4/1994 | Nishiki et al. | 359/59 |
| 5,317,433 | 5/1994 | Miyawaki et al. | 359/59 |
| 5,343,216 | 8/1994 | Katayama et al. | 359/59 |
| 5,436,635 | 7/1995 | Takahara et al. | 345/90 |

FOREIGN PATENT DOCUMENTS

| | | | |
|---|---|---|---|
| 0462619 | 12/1991 | European Pat. Off. | 359/54 |
| 2233469 | 1/1991 | United Kingdom | 345/90 |
| 90/08430 | 7/1990 | WIPO | 359/59 |

OTHER PUBLICATIONS

K. Suzuki, "Invited Address: High-Aperture TFT Array Structures", 1994 SID Digest, pp. 167–170.
M. Amato, "Invited Address: Design of Active-Matrix TFT-LCD Arrays for High-Definition Projection TV", 1993 SID Digest.
Wu, "High Definition Displays & Technology Trends in TFT-LCDs" Journal of the SID, Feb. 1, 1994.
European Pat. Application No. 90202393.6 published Mar. 20, 1991, as Publication No. 0 417 852 (Phillips Research Laboratories).
European Pat. Application No. 89111071.0 published Dec. 27, 1989, as Publication No. 0 347 790 (Honeywell Inc.).

Primary Examiner—Anita Pellman Gross
Assistant Examiner—Walter J. Malinowski
Attorney, Agent, or Firm—Kenneth J. Johnson; Ronald E. Champion

[57] ABSTRACT

An approach for constructing active matrix liquid crystal light valves having very high aperture ratio is described. This is achieved by a burying the pixel addressing elements beneath a planarized array of nearly contiguous pixel electrodes and minimizing the footprint of opaque structures in the light valve. Undesirable field-induced disclinations and deformations of the liquid crystal are minimized by shielding the addressing structures with the pixel electrodes. Embodiments are provided which utilize the approach to improve transmittance, image quality, yield, design flexibility and functionality of the display.

36 Claims, 24 Drawing Sheets

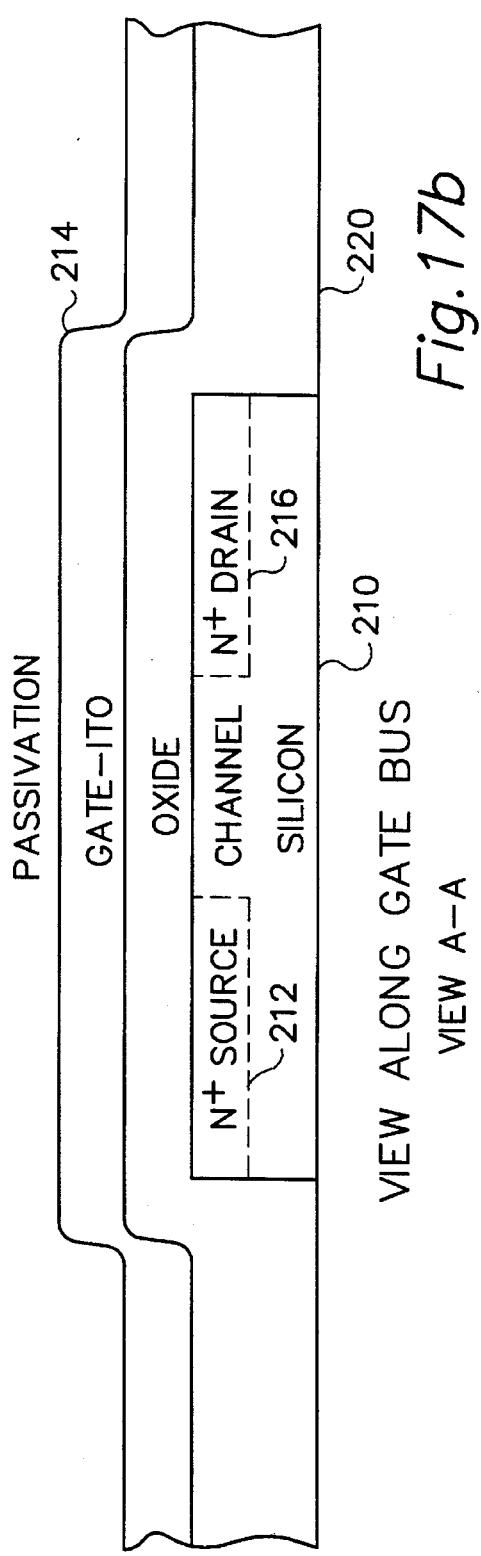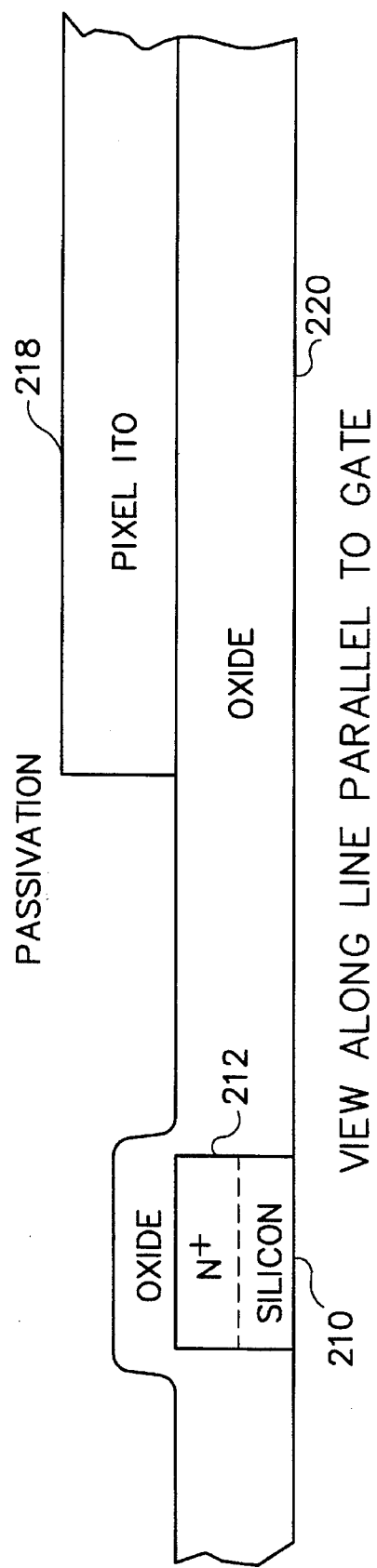

VIEW ALONG DRAIN – ITO CONTACT
VIEW C-C

VIEW ALONG THE SOURCE BUS
VIEW D-D

SIDE VIEW

END VIEW

HIGH APERTURE AMLCD WITH NONPARALLEL ALIGNMENT OF ADDRESSING LINES TO THE PIXEL EDGES OR WITH DISTRIBUTED ANALOG PROCESSING AT THE PIXEL LEVEL

FIELD OF THE INVENTION

This invention relates to active matrix light valves and displays and, more particularly, to active matrix liquid crystal display (AMLCD) technology.

BACKGROUND OF THE INVENTION

With the rapid advances being made in capacity and throughput of electronic systems, the demand for display resolution continues to increase. This will likely continue until display systems are capable of approaching the visual acuity and perceptual limits of the human eye. At the same time, such systems must be practical, having acceptable cost, size and efficiency characteristics.

One of the technologies currently receiving significant attention is the active matrix liquid crystal display (AMLCD). The popularity of liquid crystal (LC) technology stems from a variety of factors, most notably the flexibility of the technology to support a variety of sizes, configurations, costs and markets. LCDs span the range from wristwatch displays to laptop computer displays. High-end AMLCDs are being used in demanding avionics applications, and compact, high-resolution light valves are being developed for head-mounted and large screen projection displays. Application areas can be further identified by whether large direct view systems are indicated or whether small, compact projection sources are the best option.

A rather large number of LCD operating modes have been developed, indicative of the flexibility inherent in this technology. Currently, LCDs of different types compete against each other as well as against alternate display methods such as cathode ray tubes (CRTs).

Of the various LCD methods, the AMLCD is generally considered to provide the best overall display performance. By incorporating an active non-linear element, such as a thin film transistor (TFT) latch circuit at each pixel, the multiplexibility of the display is increased more readily than with passive methods. This performance comes, however, at the penalty of complexity and cost in producing the display panels. Hence, the passive devices have generally lower performance at lower cost, while the active matrix LCDs have the highest image quality but at higher cost. The challenge for both types, as well as other display technologies, is to meet existing market demands for quality and cost, as well as to push the limits on quality to open up new applications. The AMLCD is well poised to extend the resolution and performance barriers to satisfy future needs, especially in compact and medium sized displays.

Two parameters with particular relevance to enhanced LCD performance are the resolution capability and optical efficiency. Cost must also be competitive, especially for applications where there are viable alternate methods. Due to the processing complexity, AMLCD aperture ratio is typically given up to allow for improved performance and yields. Aperture ratio is the fraction of the total pixel area which actually modulates light. For small projection displays, aperture ratio is even more subject to tradeoffs due to the limited amount of total pixel area. As a result, typical aperture ratios range from 60 percent or so in large displays down to around 30 percent or less at resolutions up around 1000 lines per inch (lpi).

Future requirements can be anticipated to approach 75 pixels per degree or more at normal viewing distance. Providing this over a 50 degree field of view requires pixel counts in the vicinity of 4000 color pixels on a side. This raises interesting challenges, especially in the case of compact light valves. Aperture considerations loom as a considerable obstacle.

The conventional approach to increasing pixel density is to scale the pixel down. Unfortunately, not everything scales as desired. In the addressing matrix itself, examples include parasitic capacitances and contacts. In the liquid crystal portion of the device, the impact of LC alignment anomalies does not always scale with the pixel pitch. These artifacts are caused in part by electric fields around the active matrix addressing structures. Often, these alignment anomalies are covered up by a black matrix masking layer to prevent them from adversely affecting the contrast of the display. As the pixels are made smaller, the footprint of such structures as the black matrix take up a proportionately larger fraction of the available space, and the useful aperture can be decreased considerably.

Other LCD operating modes have been implemented which circumvent these aperture limits to varying degrees. Passive matrix approaches using transparent addressing lines can have high transmittance, but performance is otherwise limited in a variety of ways. Reflective structures have been used, but the reflection mode projection systems are generally more restrictive than transmissive systems, and the LCD operating modes used have been less desirable than the conventional transmissive twisted nematic and its variations.

For monochrome and additive color systems, the loss of aperture reduces the efficiency proportionately, and eventually makes higher resolutions impractical. The impact is even more pronounced in stacked, subtractive color systems, where the transmittance of the stacked image source can vary as the cube of the aperture ratio. Other optical effects associated with the presence of the stacked matrix structures are also strongly dependent upon the aperture ratio.

SUMMARY OF THE INVENTION

It is, therefore, an object of the present invention to provide a transmissive active matrix liquid crystal display architecture with improved image quality characteristics, increased pixel density, high contrast, and reduced pixel substructure.

It is a further object of the present invention to improve the optical efficiency of AMLCDs.

It is a further object of the present invention to provide an AMLCD architecture with simplified manufacturing process.

It is still a further object of the present invention to improve the reliability and yield of active matrix liquid crystal displays without sacrificing performance.

It is a further object of the present invention to allow increased flexibility in the design of the AMLCD pixel characteristics.

It is still a further object of the present invention to provide an AMLCD suitable for incorporation into a high resolution subtractive color AMLCD system.

These and other objects are provided by the present invention by adopting an AMLCD architecture where spurious and undesirable alignment in the liquid crystal material is minimized. Sources of undesired electrical fields are buried under and shielded by pixel electrodes which are nearly contiguous and constructed upon a planarized surface. The black matrix for contrast enhancement is reduced commensurately with the reduction in undesired depolarization of light passing through the LC. The footprints of other opaque structures in the pixel area are also minimized.

Processing simplicity and yield are enhanced by allowing for the inclusion of redundancy and relaxed tolerances without sacrificing performance.

Reliability is improved by reducing the level of dc exposure to the LC and by reduced heating in high throughput display applications.

High pixel density subtractive color is enabled through the minimization of attenuation and losses in a subtractive color stack. Further enhancement is achieved by replacing any required black matrix by a colored matrix of the appropriate spectral characteristics.

Selected embodiments provide additional benefits and methods of the present invention.

BRIEF DESCRIPTION OF THE DRAWINGS

FIG. 17b is a view of the contactless array along the gate bus, FIG. 17c is a view of the contactless array parallel to the gate bus.

DESCRIPTION OF THE PREFERRED EMBODIMENTS

Figure 1A:
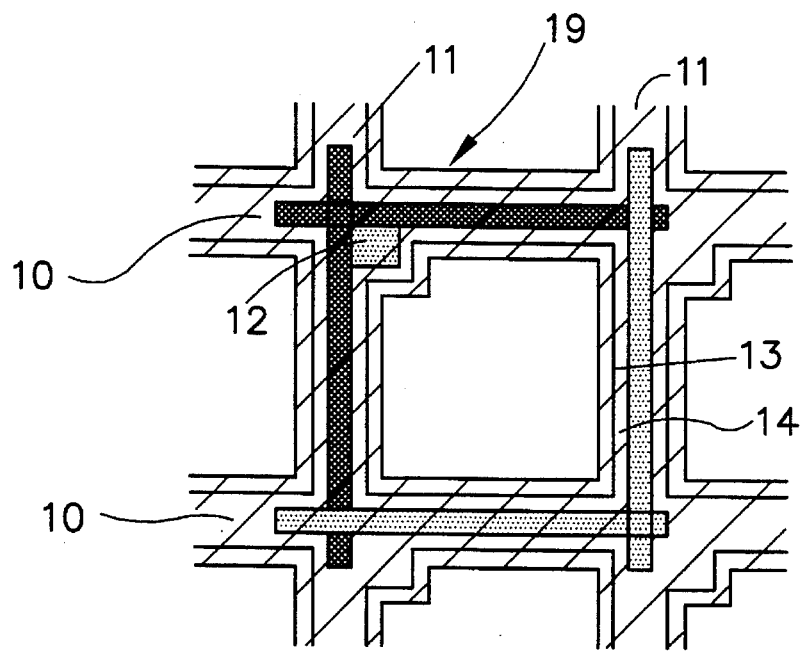
FIGS. 1a and 1b are examples of a conventional active matrix pixel.
Figure 1B:
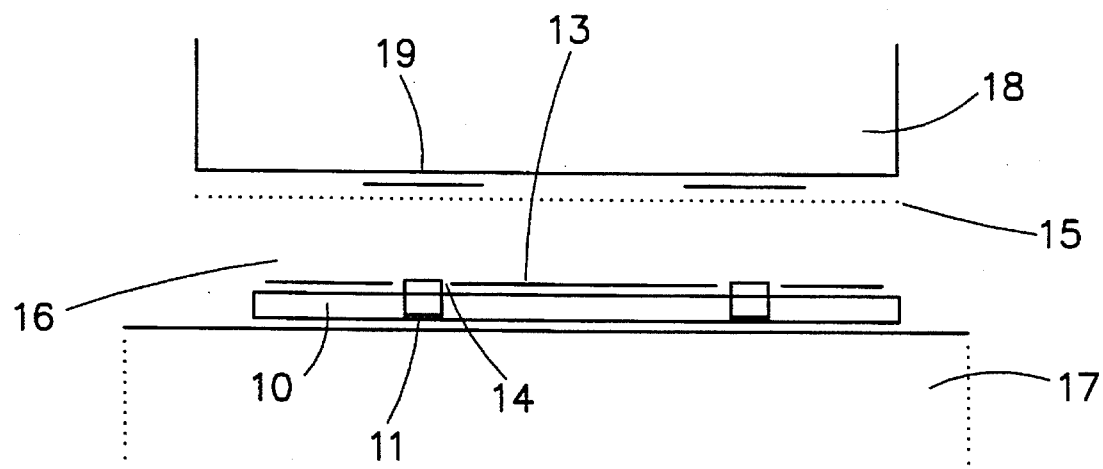

FIGS. 1a and 1b show an example of a conventional active matrix pixel. The addressing structure, shown in the top view, FIG. 1a, consists of conductive row lines 10 and column lines 11. At each intersection of the row and column line is a thin film transistor (TFT) 12, having its source connected to the column 11 and its gate connected to row 10. The drain of the TFT leads to a transparent conductive pixel electrode situated in the open area between the row and column lines. The pixel electrode 13 is separated from the row and column lines by a space 14. The remaining electrical connection to the pixel is the pixel backplane 15, shown in FIG. 1b and situated on the opposite substrate. The liquid crystal material 16 is between the two substrates 17 and 18. A black masking layer 19 is typically included to hide portions of the pixel outside the useful aperture, which in FIG. 1 is the clear portion at the center of the pixel. Additional layers, not shown, typically include passivation layers, alignment layers and color filter arrays. The pixel electrode voltage is set by the column, or source line 11 when enabled by the row, or gate line 10. The field applied to the LC results from the pixel electrode, or drain voltage and the backplane voltage. Additional structures such as storage capacitors are not shown.

The useful aperture ratio for such a structure is limited by the width of the row and column addressing lines, the transparency of the addressing lines, the width of the spaces and the size of the TFT and its contacts, as well as other opaque structures. Whereas the width of the lines and spaces scale with the lithography design rules, other dimensions do not. For example, the constant voltage differences between the pixel electrode and the lines gives rise to LC orientation effects which do not scale in the same way. The voltage on the lines gives rise to field lines extending both to the backplane and to adjacent pixel electrodes. There are also practical limits to reducing the cell gap dimension.

Figure 2A:
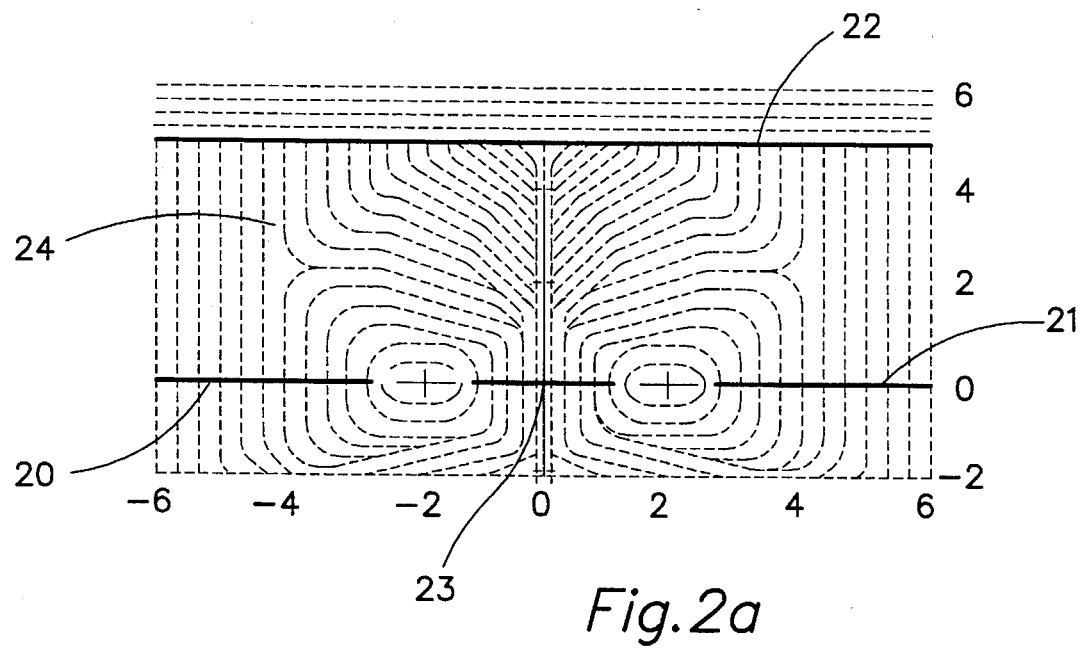
FIGS. 2a and 2b show approximate electrical fields near the addressing lines on a conventional active matrix pixel.
Figure 2B:
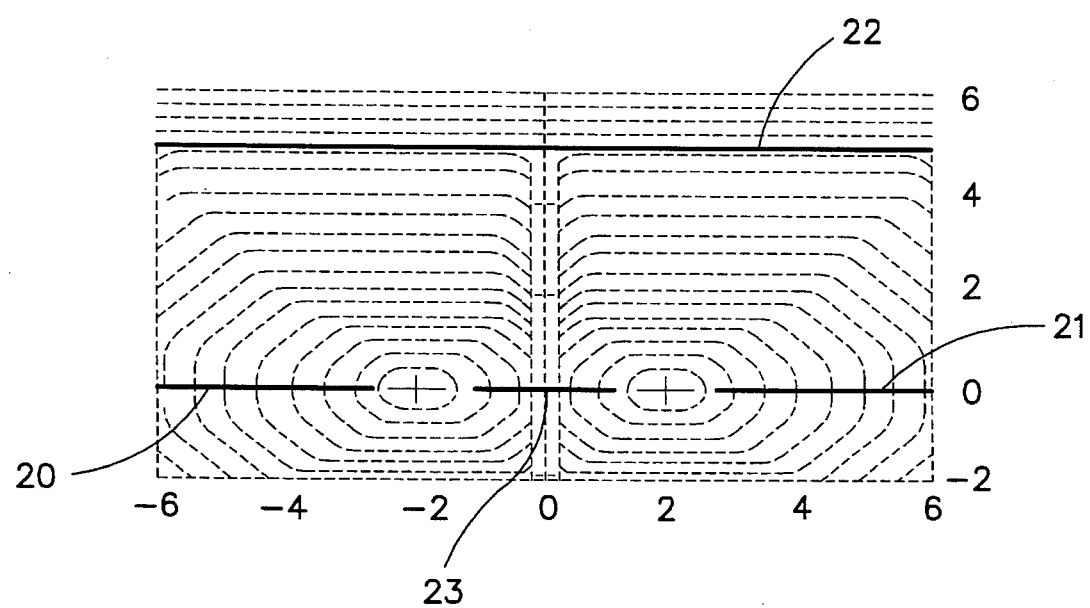

FIGS. 2a and 2b are cross sectional views showing approximate field orientations (not considering the dielectric anisotropy of the LC) near the edges of a conventional pixel. In FIG. 2a, the pixel electrodes 20 and 21 (only partially shown) are at zero volts with respect to the backplane 22 (zero volts), and the addressing line 23 is taken to have an applied voltage of −10 volts. In the ideal scenario with zero volts applied to 20 and 21, there should be no field lines in the LC, or cell gap region 24. Approximate length scales are shown in microns. In this figure, field strength is indicated by the length of the field line with the longest lines indicating that the field is at or above the field applied in an energized region of the display (here we assumed around 5 volts across the 5 micron cell gap). It is readily seen that the effects of the addressing line voltage extend well into the pixel electrode region. In a display, this gives rise to deformations and disclinations in the LC alignment. A disclination can be thought of as being the LC analog of a crystal grain boundary. Both disclinations and deformations tend to depolarize the light passing through. Since the LC is a polarization control element, this affects the amount of light which is transmitted. The depolarization can often be tolerated in the white state, but in the dark, or black state such depolarization allows light to pass and degrades the contrast ratio. Here, we will define contrast ratio as the ratio of transmittance in the white (transmitting) state to that in the black (non-transmitting) state. The conventional approach for maintaining a high contrast ratio is to add a black masking layer, or black matrix, to hide the depolarized light as was shown in FIG. 1a. This masking layer can be quite large, extending beyond the lines, spaces and TFT into the pixel electrode region.

The extent of black masking required in a normally black state can be visualized from the field lines in FIG. 2a. FIG. 2b shows the comparable field lines with both pixel electrodes 20 and 21 energized to +5 volts, again with the addressing line 23 at −10 volts and the backplane 22 at zero volts. This indicates the penetration of the addressing line fields into the pixel for the black state of a normally white display.

Figure 3A:
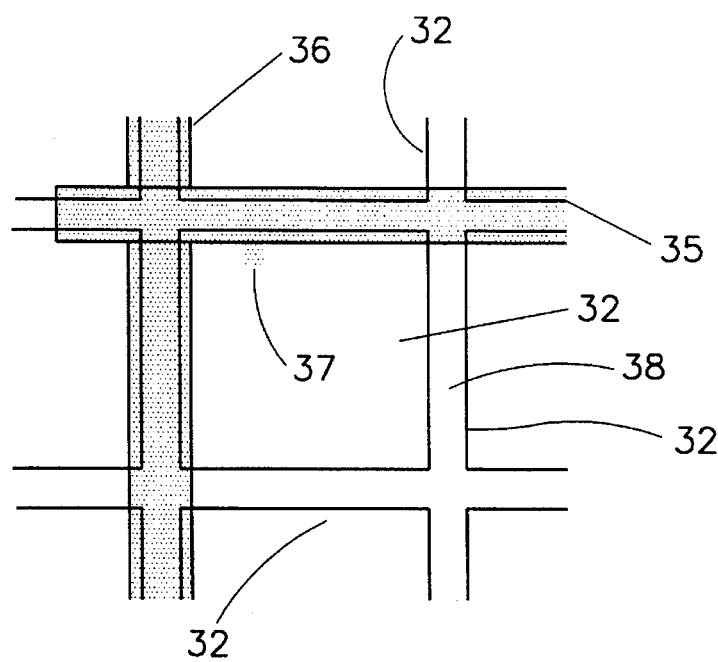
FIGS. 3a and 3b are views of the preferred embodiment of a high aperture active matrix pixel architecture.
Figure 3B:
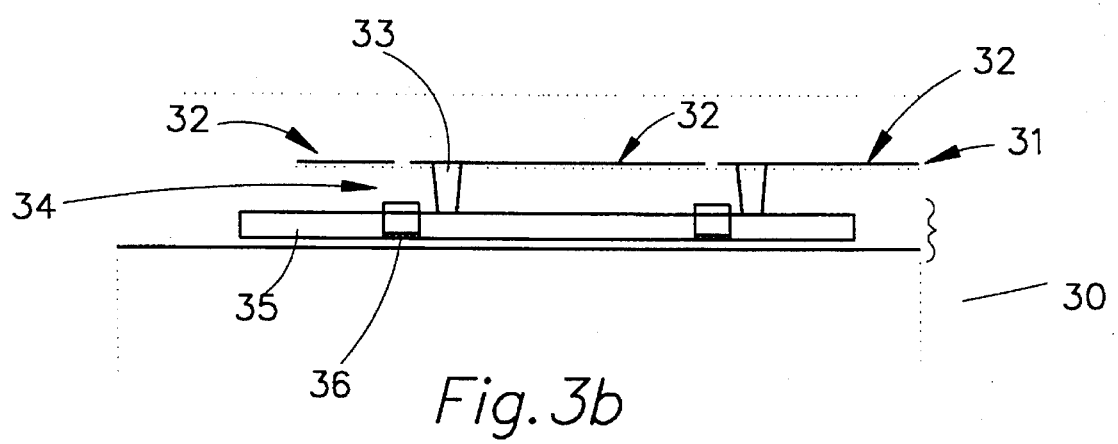

A major objective of the present invention is to effectively suppress these undesirable fields and to greatly reduce or eliminate the need for the black mask structure. Disclosed in FIGS. 3a and 3b are views of a preferred embodiment of the active matrix pixel architecture described herein. All embodiments of the invention contain common attributes which are best illustrated in FIG. 3. FIG. 3b shows a side view of the basic buried architecture. In this embodiment, the entire active matrix addressing structure 30 is buried under a nearly contiguous array 31 of transparent pixel electrodes 32. The pixel electrodes are connected to the matrix using conductive vias (direct connections) 33 which pass through non-conducting layer 34. The insulating layer 34 is preferably planarized, although complete flatness is not required. Control of the various interelement capacitances can be gained by adjusting the thickness of layer 34 or other physical parameters. The thickness is preferably in the range of 0.5 to 5 microns, although larger or smaller thicknesses may certainly be utilized. In this embodiment, the row addressing lines 35 and column addressing lines 36 are shown as residing directly under the spaces between pixel electrodes 32, however additional benefits may be obtained by positioning the lines directly under the electrodes. This will be described further in a subsequent embodiment. Further clarification of the pixel configuration is seen in the top view, FIG. 3a. At the intersection of the row and column addressing lines lies an active pixel circuit 37, such as one or more thin film transistors. In the embodiment of FIGS. 3a and 3b, a portion of active pixel circuit 37 is buried beneath row addressing line 35. Additional rows and columns (not shown) lie below the other spaces 38 between pixel electrodes 32. In this embodiment, no black masking layer is shown, for reasons which are discussed below. The resulting pixel provides for significant advantages over the prior art.

Figure 17A:
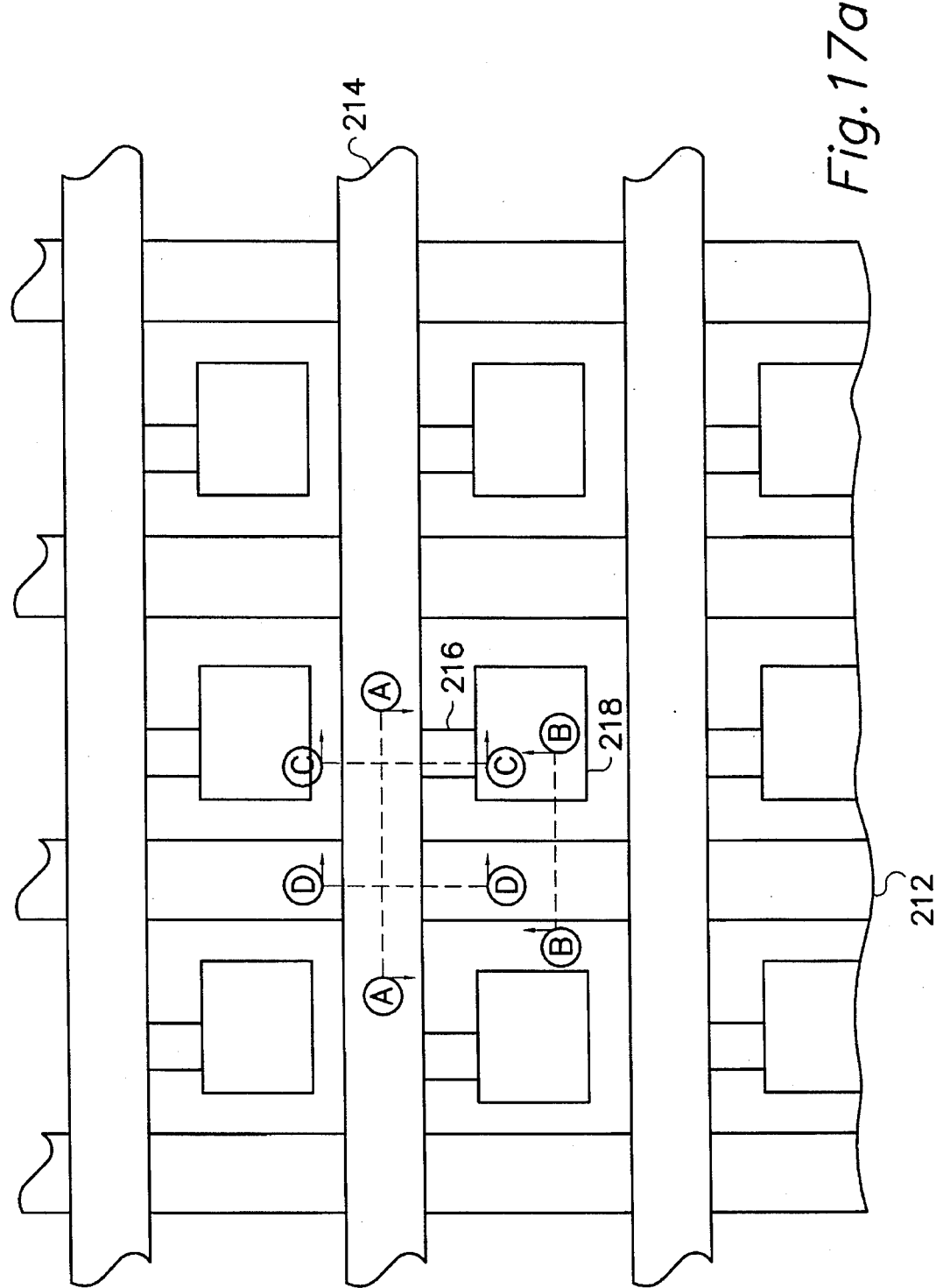
FIG. 17a is a top view of a contactless array.

Candidate detailed designs for the underlying active matrix are well known from the prior art. Since these are optimized with differing goals in mind, however, best performance can be achieved by adopting methods specifically aimed at reducing the footprint of opaque structures in the matrix, such as the addressing lines and TFT structures. A preferred example of this approach is minimum footprint contactless and shared contact scalable active matrix structures. FIG. 17a discloses a partial top view for a contactless array architecture for a large aperture ratio active matrix liquid crystal display (AMLCD). The array in the first embodiment of the invention is comprised of source buses 212 which run vertically and are in electrical contact with display drivers (not shown) that provide the image signals. The source buses 212 intersect gate buses 214 which run horizontally. The gate buses are also in electrical contact with the display drivers (not shown). Interspaced between the intersections of the gate and source buses are the transparent electrodes 218 for each pixel in the liquid crystal display. The pixel electrodes 218 are in electrical contact with drain regions 216. All the elements shown in FIG. 17a are disposed on a common substrate. The intersection of the source bus, drain region, and gate bus form a thin film transistor (TFT) which is the switching element for the pixels in the display. A better understanding of the construction of the TFT can be understood by study of FIGS. 18 and 17b–17e.

Figure 18:
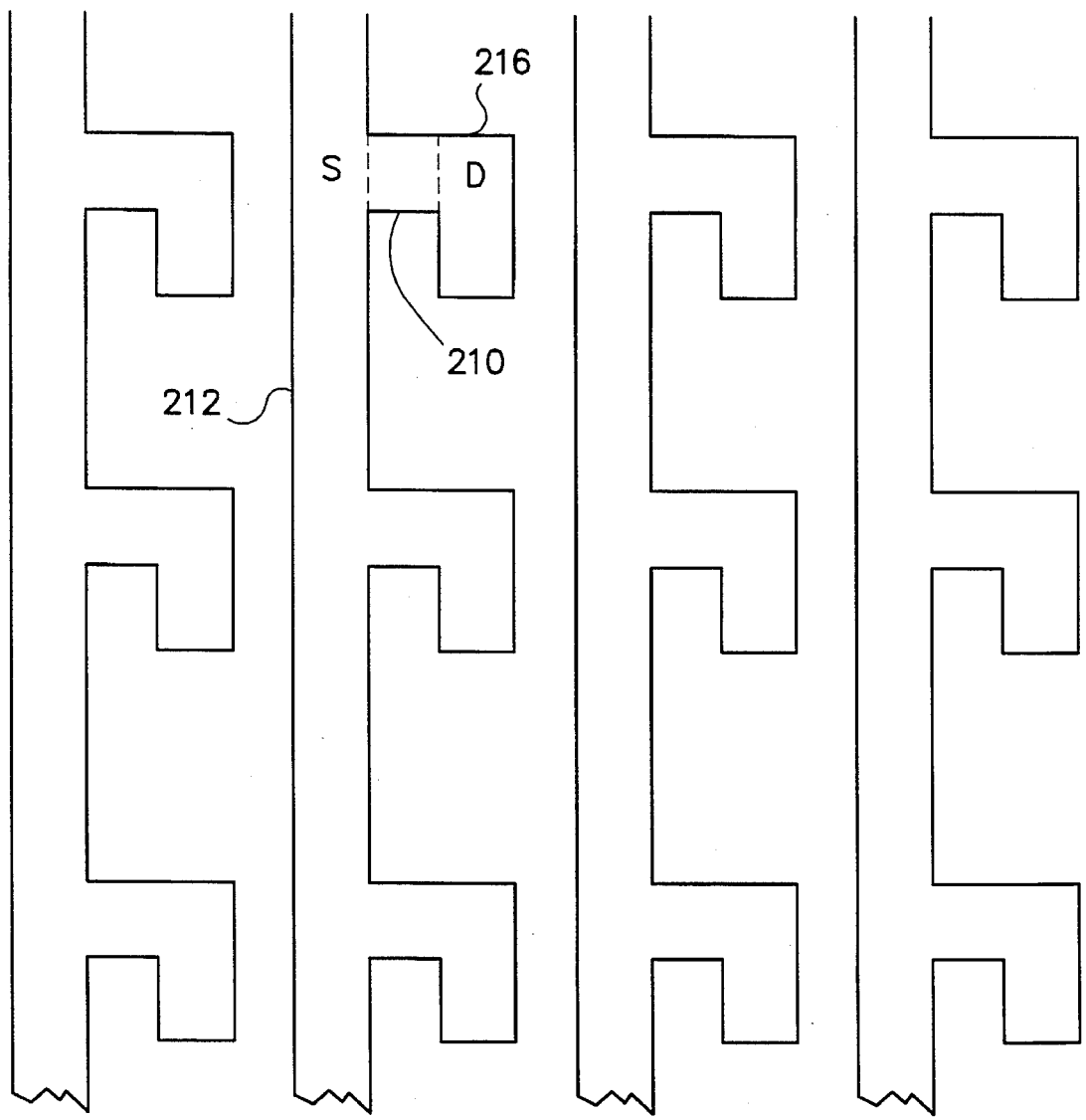
FIG. 18 is a top view of the source and drain regions in the single crystal silicon layer for the contactless array.

FIG. 18 is a view of just the source bus and drains deposited on a clear glass substrate which serves as the base layer for the entire active matrix. The source buses 212 are defined in a buried layer of single crystal silicon 210 that has been heavily doped n+ to reduce line resistance. The region defined by the drain 216 has also been heavily doped n+. The region between the source 212 and the drain 216 which is part of the silicon layer 210 is left undoped. The source buses and drains may also be constructed of a strip of refractory metal silicide such as titanium, or Tungsten, laid on top of a layer of polysilicon. This can be done in the cases where a lower resistance is required. Further, the gate buses and drains may also be constructed of transferred silicon through a technology provided by the Kopin Corporation. Referring again to FIG. 17a the gate buses are then laid over the source buses and the transparent electrodes are interspaced between the intersection of the buses. The gate bus in the preferred embodiment is constructed from indium tin oxide (ITO) which is transparent and conductive. This material has the proper conductivity to carry the gate signal. Other possibilities for gate bus materials are polysilicon or a refractory metal silicide like titanium as Tungsten. The gate and drain buses may also include a layer of refractory metal silicide such as titanium, which could be laid on the top of the silicon. This can be done in the cases where a lower resistance is required.

From the cross section along the gate bus shown in FIG. 17b, the construction of the TFT is apparent. After the silicon layer which defines the source bus and the drain bus is laid, a layer of oxide is then deposited over these components. The gate bus is then deposited on the oxide layer so as to intersect the source bus. The source region 212 of the silicon layer 210 is proximate to the drain portion 216, and current through the transistor is controlled by the signal traveling over the gate bus 214. The cross section shown in FIG. 17c which is a cut through the transparent electrode shows the proximity of the pixel electrode 218 to the source bus 212.

Figure 17D:
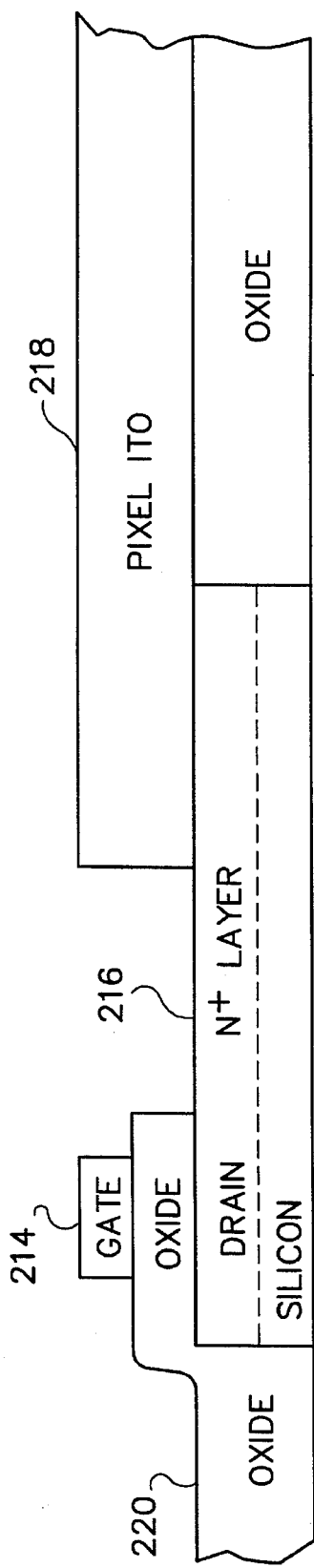
FIG. 17d is a view of the contactless array along the drain.
Figure 17E:
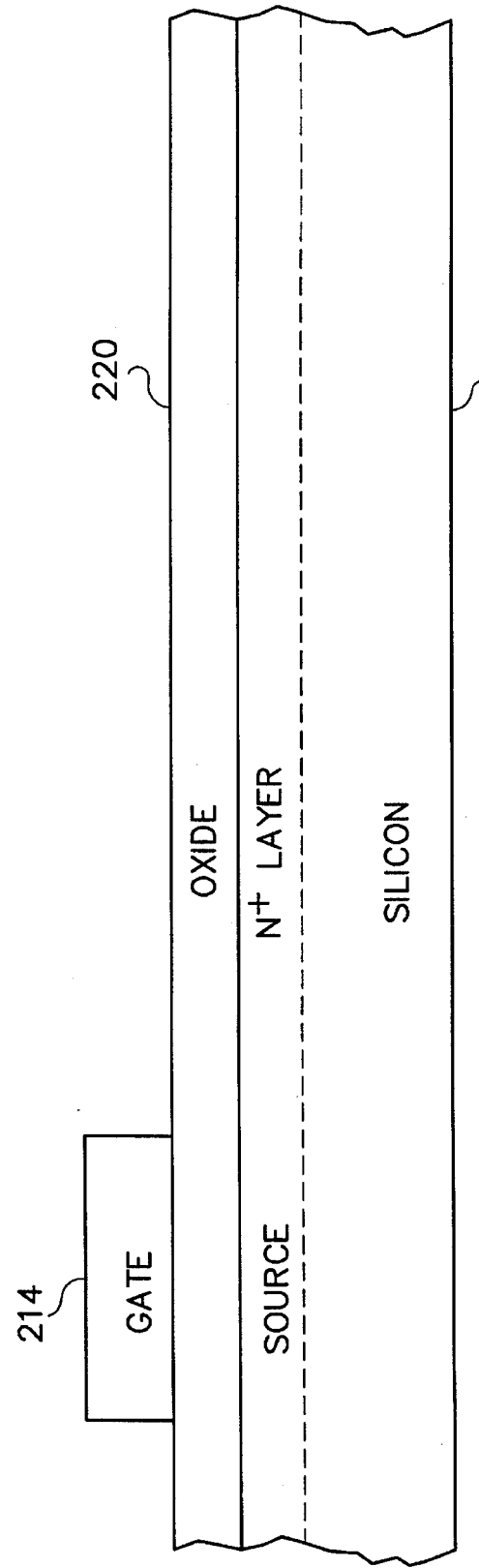
FIG. 17e is a view of the gate bus along the source bus.

The cross section shown in FIG. 17d is taken in a direction parallel to the drain 216. Shown in particular is the electrical contact between the drain and the pixel electrode 218 as well as the proximity of the drain to the gate bus. The nature of the connection between the drain and the pixel electrode is clearly evident. This contact is made through well known semiconductor fabrication techniques rather than a metal contact. The cross section shown in FIG. 17e is along the source bus. Shown in particular is the relationship between the source bus and the gate bus.

The elements in FIG. 17a combine to form the active matrix for a liquid crystal display. Image signals are transmitted along the gate and source buses so as to selectively provide a charge at the pixel electrodes. As will be described in more detail below, the absence or presence of a charge at the pixel electrode controls whether that pixel is either on or off. As is well known in the art, the turning on or off of that pixel is in response to the switching of a transistor which is proximate to the pixel. In prior art AMLCD's, these transistors require metal contacts between the source bus line and the transistor as well as a metal contact between the drain of the transistor and the drain electrode. These metal contacts are a weak link in the LCD because it is well known in CMOS technology that one of the first thing to fail in these transistors is the metal contacts. The matrix shown in FIG. 17a has no metal contacts connecting the bus lines to the transistor and the transistor to the drain electrode. Further, the use of transistors with metal contacts requires that the transistor be located in a corner of the pixel aperture. In the present invention, the construction of the transistor is incorporated into the construction of the bus lines, thus maximizing the pixel aperture.

Figure 19:
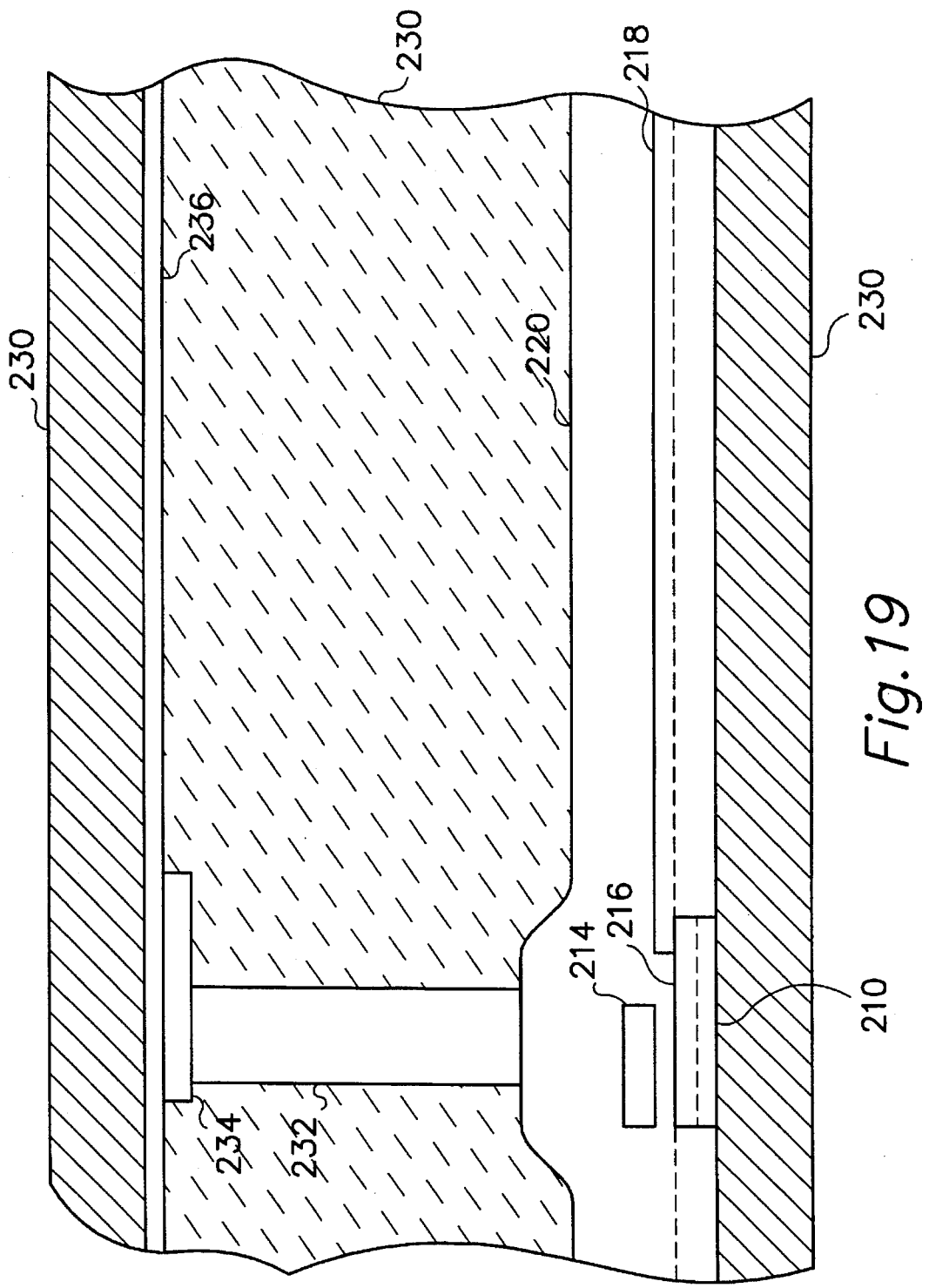
FIG. 19 is a cross sectional view of a pixel in the large aperture ration AMLCD.

The incorporation of the matrix shown in FIG. 17a into a liquid crystal display picture element is shown in FIG. 19. FIG. 19 is a cross section all view of the active portion of a liquid crystal display through the middle of a single pixel. Included in the active portion of the display are the glass substrates 230 which enclose the elements described above. Laid over the lower substrate 230 is a layer of single crystal silicon 10. This silicon layer is masked off in a pattern as shown in FIG. 18 and the unmasked portion is oxidized and the nitride is removed. With the source and drain regions defined, these areas are heavily doped through phosphorous implant. A gate oxide layer is then laid over the source and drain regions and a gate made of ITO or polysilicon is deposited over this gate oxide. The gate material is then implanted with boron and the source lines are counter doped. The transparent electrode ITO is then laid over the oxide so as to be located between the intersections of the gate and bus lines and to be in electrical contact with the drain region. As seen again in FIG. 19, a layer of oxide is then deposited over the gate line as well as the pixel ITO. In order to define the pixel a spacer post 232 is deposited over the gate line and source lines. A nichrome block 234 is positioned between the spacer post and the common electrode 236 which is also made of ITO. This common electrode has been deposited previously upon the upper glass substrate 230. As in all liquid crystal displays, liquid crystal fills the gap between the lower electrode 218 and the upper electrode 236.

As is known in the art, the largest reduction in the aperture area of conventional AMLCD layouts is due to interconnects and contacts. Specifically, the source and gate bus lines dramatically reduced the pixel aperture. These buses must be made larger than the minimum photolithographical dimension due to the presence of source and drain contacts at each pixel. In the embodiment described above, contacts are eliminated in the array. This results in a significantly greater aperture ratio than is available with most conventional architectures.

In a third embodiment of the invention, a shared source contact architecture is disclosed for a large area AMLCD's. In some AMLCD architectures, it may be necessary to maximize the aperture ratio for each pixel while also reducing the source bus line resistance. A solution for this problem is to provide a series of evenly spaced contacts along the source buses to provide current to the individual pixel transistors. This configuration offers significant advantages over the prior art which has electrical contacts at each pixel transistor.

Figure 20A:
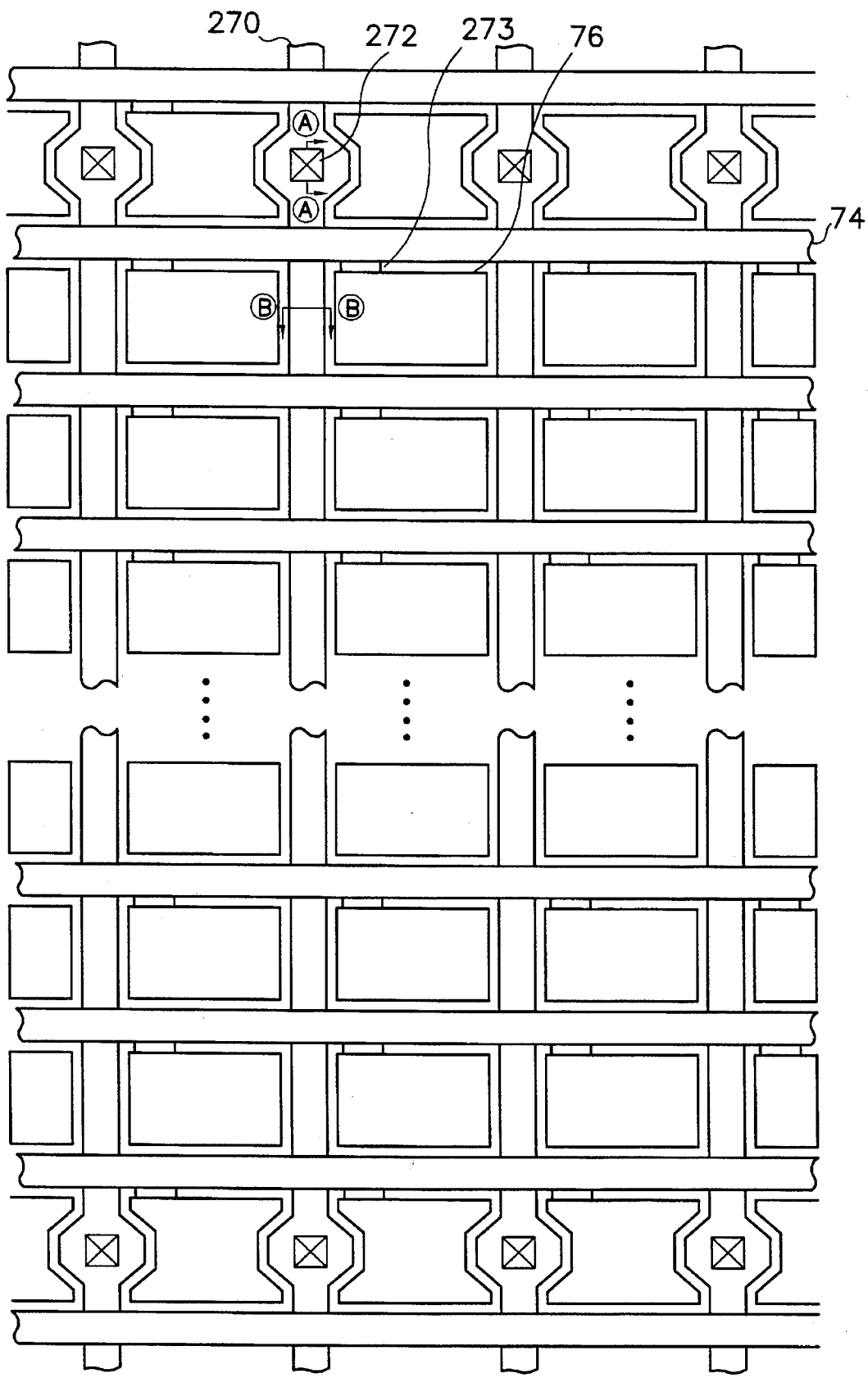
FIG. 20a is a top view of the shared contact array.

The top view tier the third embodiment of the active matrix architecture is shown in FIG. 20a. Included in this matrix is source bus 270 assembly, which is intersected by gate bus 274. Proximate to the intersection of the source and gate lines are pixel electrodes 276 which are in electrical contact with the drain electrode 278. The main difference between this embodiment of the invention and the first embodiment described above, are the electrical contacts 272 which are evenly spaced along the source bus. As mentioned above, the contacts are placed at regular intervals along the source line in order to reduce the source line resistance. The number of gate lines between source contacts is typically on the order of 32. The actual number depends on the capacitive time constant during charging of the source bus lines during the AMLCD operation.

Figure 20B:
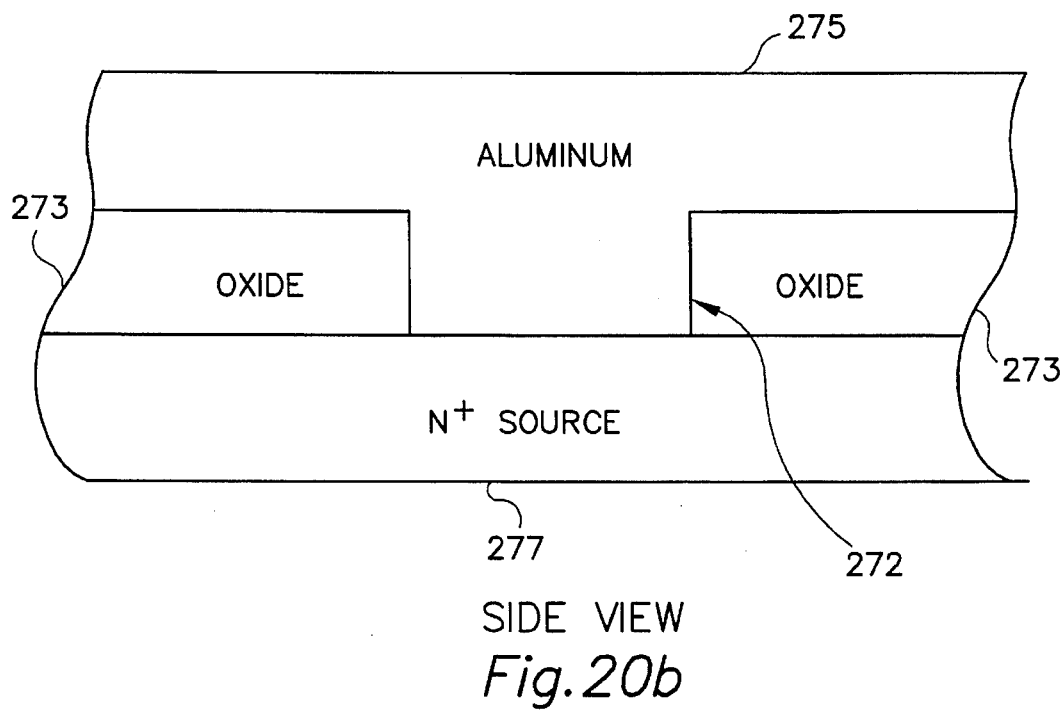
FIG. 20b is a cross sectional view of a shared contact.
Figure 20C:
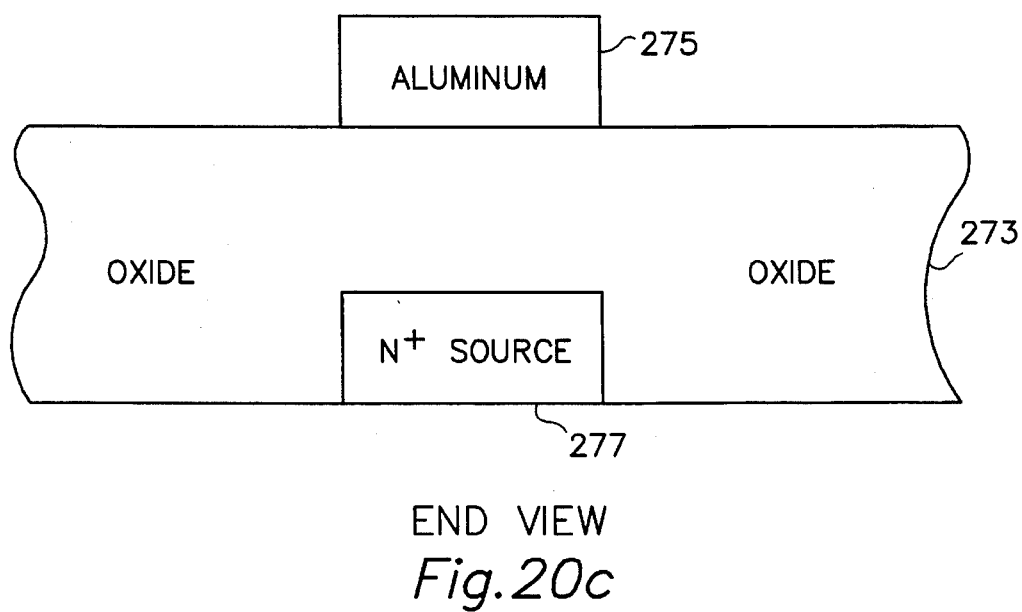
FIG. 20c is a cross sectional view of the source bus.
Figure 21:
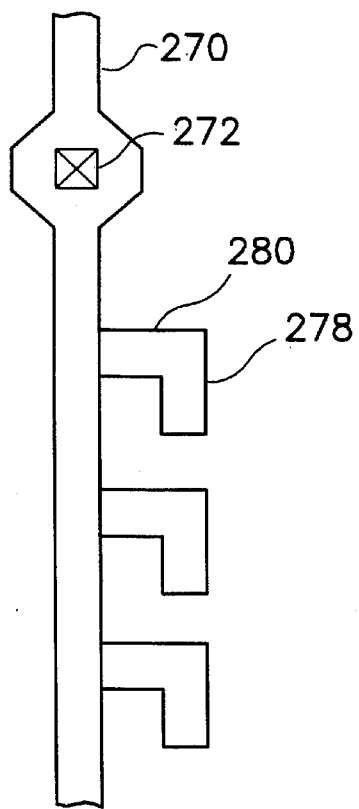
FIG. 21 is a top view of the source and drain regions in the single crystal silicon layer for the shared source array.
Figure 21:
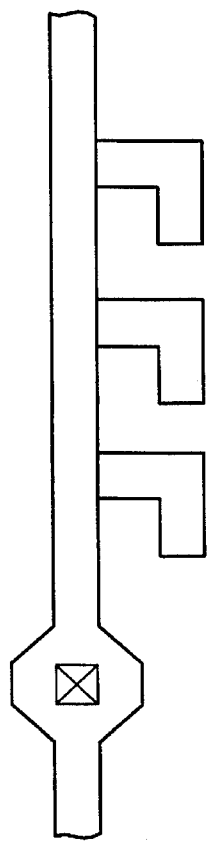

FIG. 21 is a top view of the single crystal silicon layer 280 which through masking and doping has been modified to include source bus assembly 270 as well as drain electrode 278. Also included are electrical contacts 272 which are evenly spaced along the source line. As seen in FIG. 20b, these electrical contacts 272 provide an electrical connection between an aluminum strip 275 of the source bus assembly 270 which runs from the LCD driver (not shown) over the single crystal silicon layer 277. An insulating layer is provided between the silicon layer and the aluminum strip. The relationship between the aluminum strip 275 and the single crystal silicon layer 277 can be seen clearly in FIG. 20c. The transistor configuration for this embodiment is identical to that shown in the first embodiment described above. The only difference between the third embodiment and the first embodiment is the inclusion of the contact along the source line. The contacts 272 only encroach on the pixel aperture at a preset interval while allowing the maximum aperture ratio for the remaining pixels. This provides the maximum aperture ratio for a given photolithographic resolution while maintaining superior dynamic performance. We may take contactless as meaning that all contacts in the array of addressing lines and active pixel circuits are external to the array containing the pixels. In addition to minimizing the opaque structures, this approach offers considerable simplification of the fabrication process over conventional methods, and is especially well suited to incorporation with the buried architecture methods described herein. The fabrication processes used for the matrix, planarization and via structures are well known to those skilled in the art.

Figure 4A:
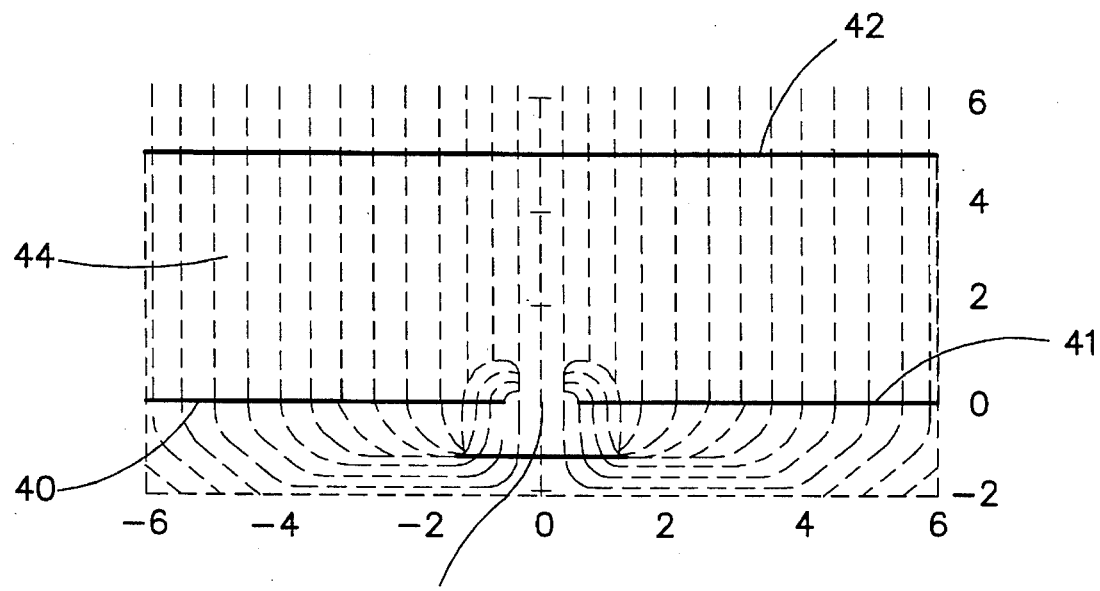
FIGS. 4a and 4b show approximate electrical fields near the addressing lines in the high aperture active matrix pixel architecture.
Figure 4B:
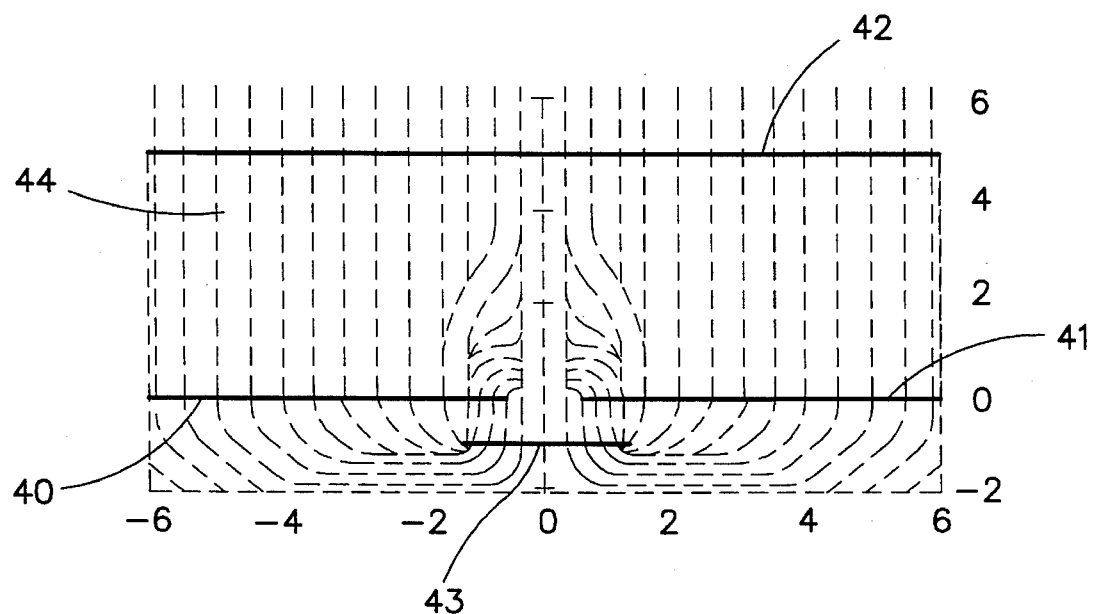

Benefits of this buried architecture are readily seen by comparing the calculated field distribution for this configuration, shown in FIGS. 4a and 4b, with those previously discussed in FIG. 2. FIG. 4a shows the field-off case. Here, pixel electrodes 40 and 41 and the backplane 42 are all at zero volts, with the buried addressing line 43 at −10 volts. It is clearly seen that the broad field spreading observed in the cell gap 24 of FIG. 2a is quite effectively suppressed by the buried line arrangement. The cell gap region 44 is where liquid crystal material or other transmissive electro-optic medium is placed and electrically shielded from the addressing lines by the pixel electrodes. The field-on case, in FIG. 4b, also shows excellent suppression of non-uniform fields as compared with FIG. 2b.

Figure 5A:
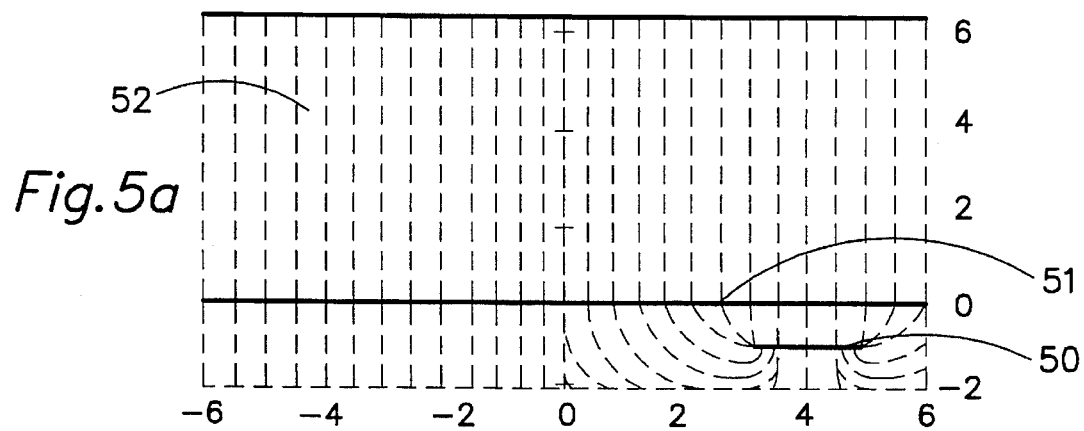
FIGS. 5a, 5b, and 5c shows field configurations for additional pixel element layouts.
Figure 5B:
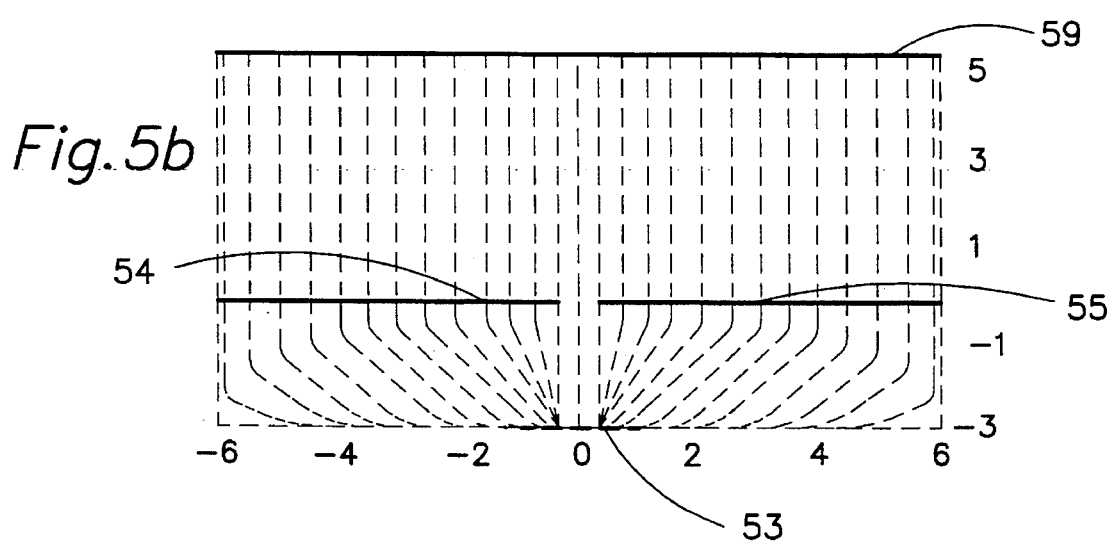
Figure 5C:
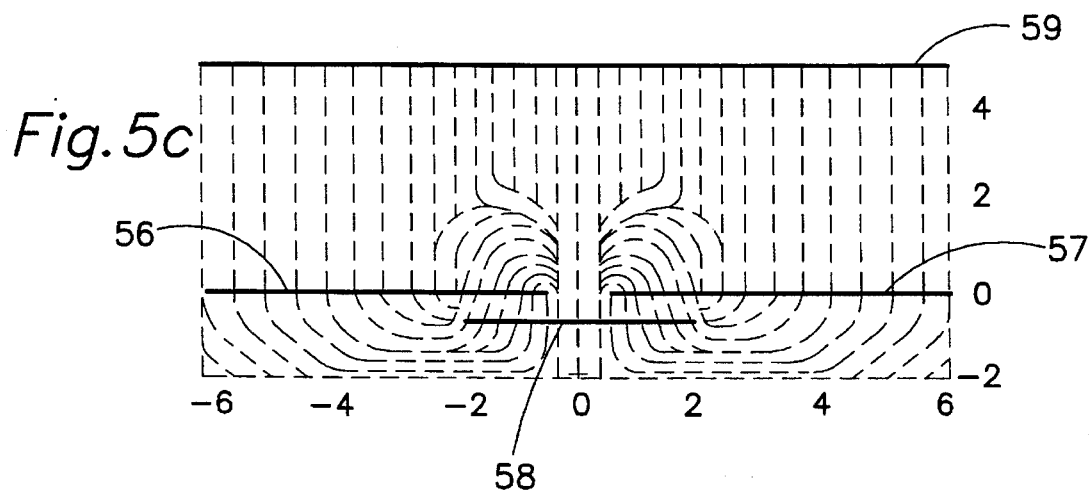

The details of the embodiment shown in FIGS. 3a and 3b and FIGS. 4a and 4b can be readily altered to tailor the disclination control and positioning of opaque structures as desired. FIGS. 5a–c show several modifications of the configuration in FIGS. 4a and 4b. FIG. 5 shows field-off cases, with the backplane 59 and all pixel electrode voltages at zero, and the address line voltage at −10 volts. In FIG. 5a, field penetration into the cell gap 52 is virtually eliminated by positioning the address line 50 under the pixel electrode 51. In FIG. 5b, field penetration is suppressed by burying the address line 53 further beneath the pixel electrodes 54 and 55. Analogously, the separation between electrodes 54 and 55 could be reduced. These methods would also suppress the very localized field leakage where address lines pass under pixel electrode spaces which are oriented perpendicular to the address lines. Field-on cases, though not shown, would show similar suppression of stray field penetration. If some field nonuniformity is desired, the effective shielding by the pixel electrodes can be reduced. This is demonstrated in FIG. 5c, where the space between pixel electrodes 56 and 57 has been widened, and the addressing line 58 is closer. A localized disclination generated in this way can serve, in essence as a nucleation site for potential disclinations in arbitrary, dynamic imagery. In much the same way, superimposing specific surface structure or alignment topography onto the planarized surface, where it is proximate to the liquid crystal layer, can provide additional disclination control. The details of dynamic disclination behavior are tied to many parameters in addition to the electrode geometry, including alignment geometry, LC parameters, voltage sequencing, and image content.

Figure 6A:
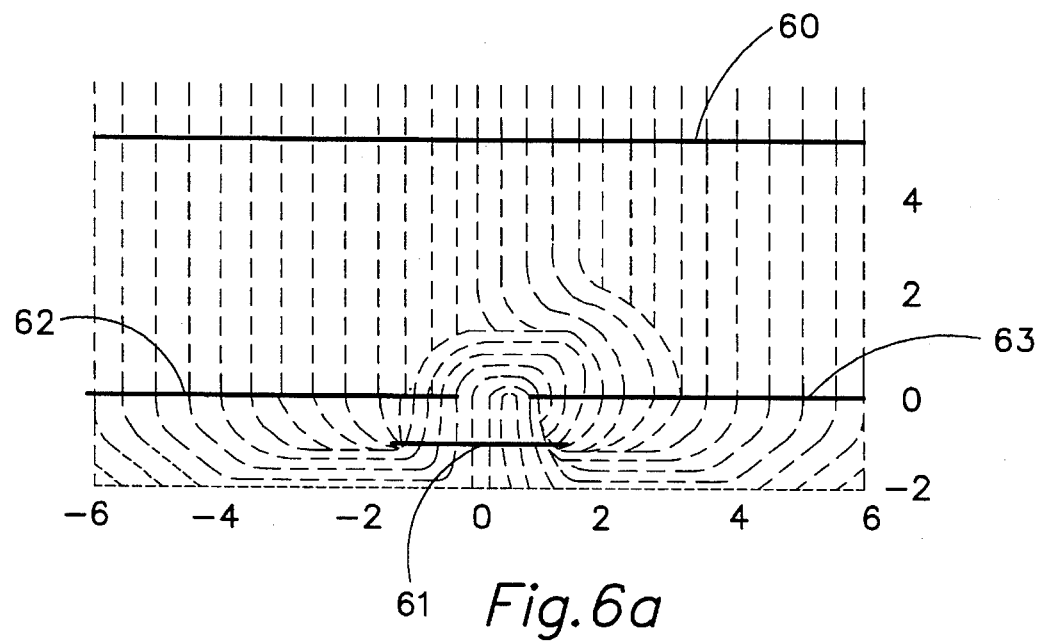
FIGS. 6a and 6b show field configurations for examples of non-uniform image content.
Figure 6B:
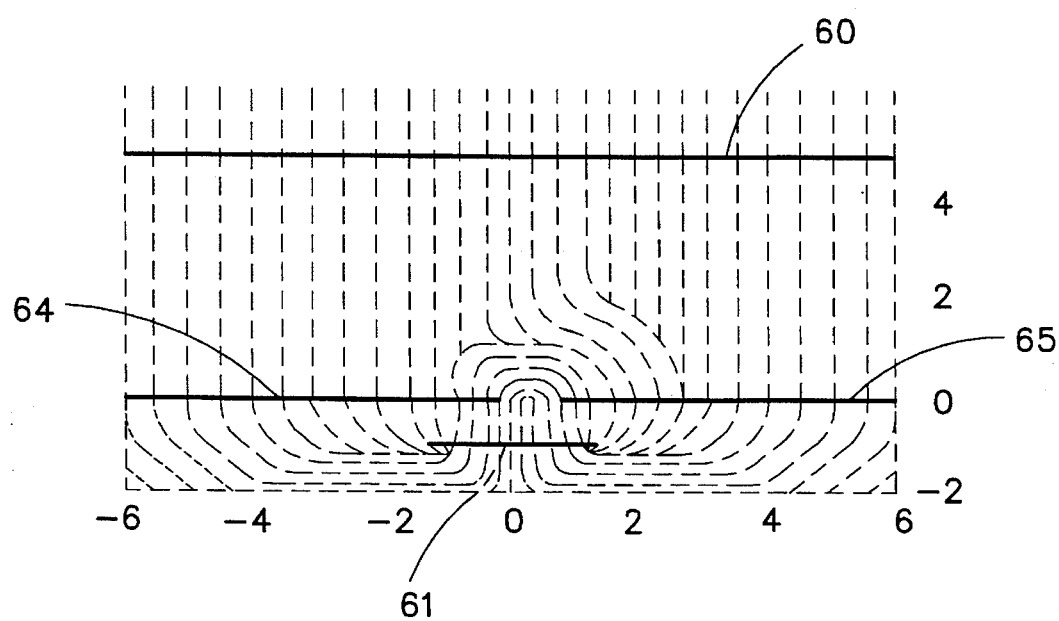

In addition to the field-off and field-on states, it is easily seen that the field uniformity is controlled and disclinations can be eliminated for any uniform grayscale applied voltage level. By uniform in this context, we mean that adjacent pixels have the same voltage. In general, however, an arbitrary displayed image will include regions where the image data is changing from pixel to pixel. FIGS. 6a and 6b show two such cases, again with backplane 60 at zero volts and address line 61 at −10 volts for sake of example. In FIG. 6a, pixel electrodes 62 and 63 are biased at zero volts and −5 volts, respectively. FIG. 6b shows a similar configuration with pixel electrodes 64 and 65 biased at 1 and 4 volts, respectively. In these cases, there clearly are lateral fields and possibly disclinations associated with the spatially varying potential. What is important to note, however, is that these edge effects occur when the region is not selected to be high contrast, and can be considered normal. They merely contribute to the edge profiles in the displayed image, and the severity of the distortion scales with the voltage difference between the pixels.

Figure 7:
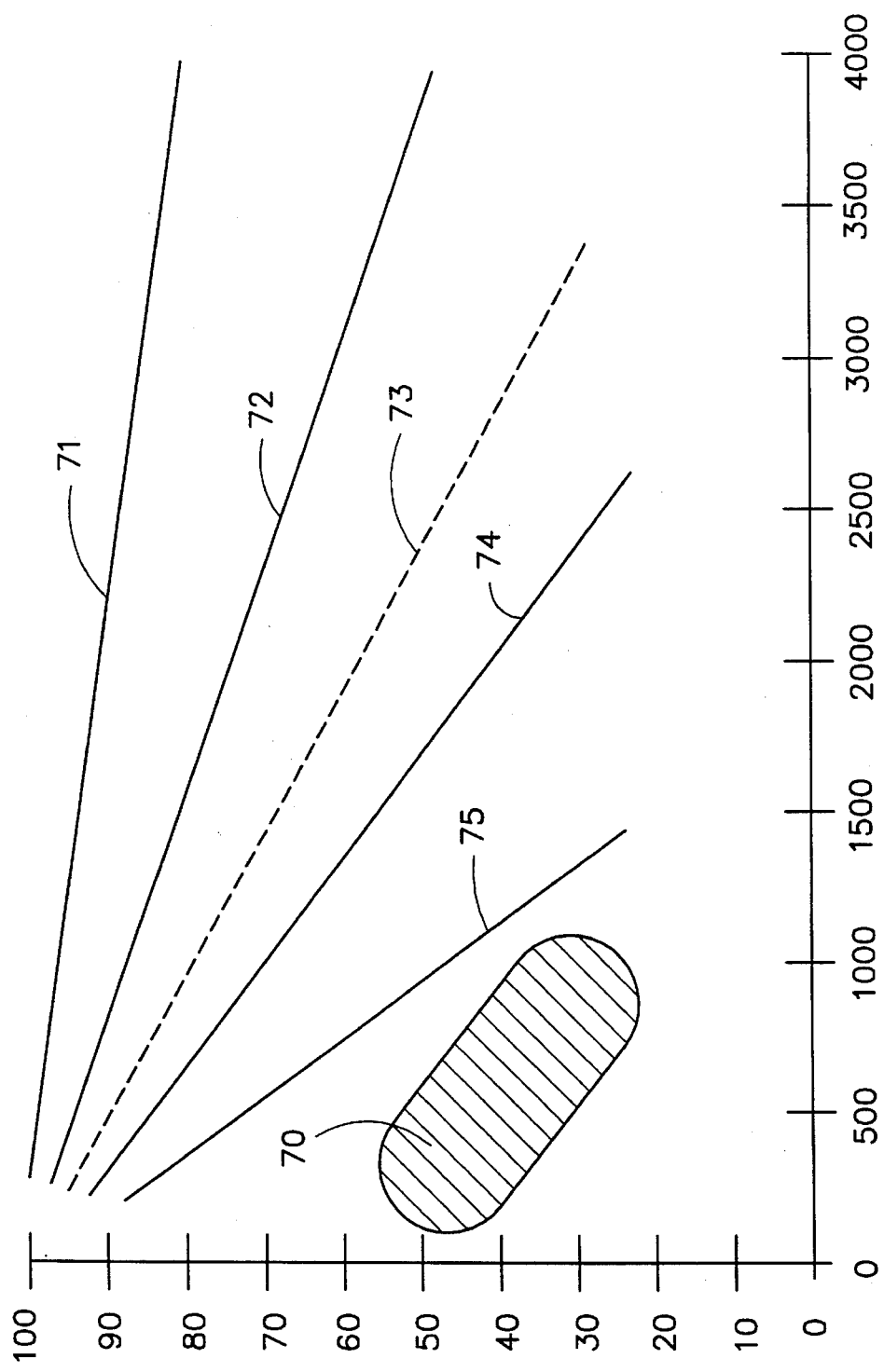
FIG. 7 shows predicted aperture ratios versus pixel density with the present invention.

The most striking demonstration of the advantages of this approach can be seen in FIG. 7, where the predicted aperture ratio is plotted against the pixel density in lines per inch for various sets of design configurations. Shown as a baseline is a region 70 on the chart mapping out the vicinity of the majority of prior art implementations. Lines 71, 72 and 73 represent the predicted performance with feature line widths of 1, 2 and 3 microns respectively, along with appropriate aperture losses due to a thin film transistor and via. Assumed for these predictions is the scalable, contactless matrix architecture with buried TFTs discussed earlier, although significant improvement over the prior art is achieved by using the present invention with conventional matrix approaches as well. Lines 74 and 75 represent even more conservative cases, with coarser design rules and larger allowances for the exposed transistor area. Line 75 assumes line widths of 5 and 10 microns for the rows and columns. In all cases the predicted performance is significantly above the representative prior art region.

Figure 8A:
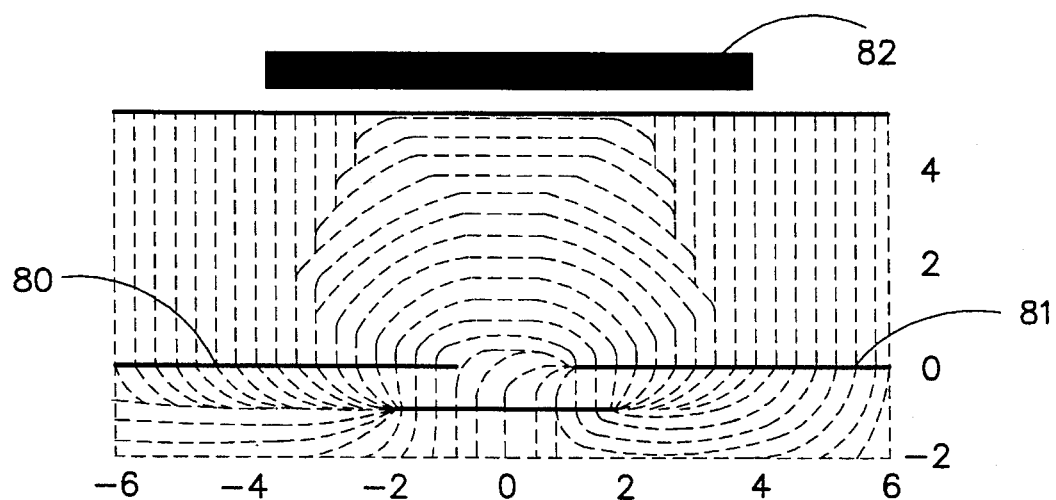
FIGS. 8a and 8b are field diagrams for a second embodiment of the present invention.
Figure 8B:
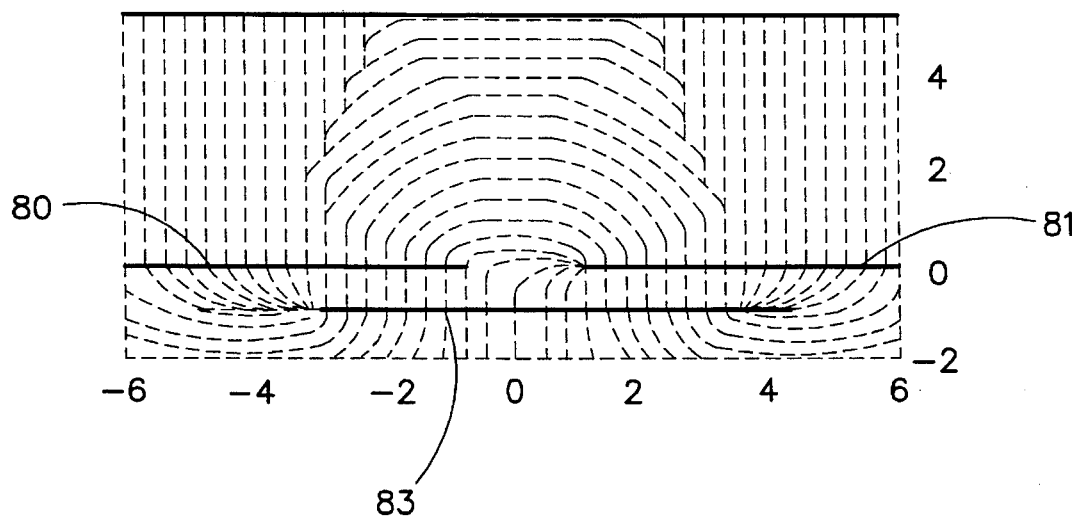

Under certain circumstances, it may be desirable to retain a minimal black mask over the edge of the pixels. FIGS. 8a and 8b show the field distribution for a second embodiment of the invention, in which this is done. In FIGS. 8a and 8b, adjacent columns of pixel electrodes 80 and 81 are driven with voltages of opposite polarity. This might be done, for example, to minimize the appearance of flicker on a panel with imbalanced positive and negative cycles. The embodiment of FIG. 8a shows a supplemental black mask 82 over the region to be masked. It should be noted that while some of the aperture is being given up to block these disclinations, this is only required if the panel is prone to flicker. Even then, this is most typically only done along one axis to minimize the appearance of average flicker. Additionally, the extent of the masking is considerably less than it would be in a conventional layout. The variation in FIG. 8b shows how the buried architecture can be used to advantage even in the presence of this interleaved polarity configuration. In FIG. 8b, the addressing line 83 (column line in this embodiment) is selected to be substantially opaque, aluminum for example, and serves a second purpose as the black mask. This would not be feasible in the conventional configuration of FIG. 2, as the undesired field lines extend well beyond the edge of the addressing line. The advantages are four-fold. First, the elimination of the black mask, assuming it can be eliminated everywhere using similar techniques, simplifies the construction of the device, especially if the black mask would otherwise be on the backplane substrate and require precision alignment. A second advantage is the increased current-carrying capacity of the addressing line due to its width. This can improve uniformity or allow the use of higher resistivity materials, and possibly reduce the number of contacts in the array. A third significant advantage is in the area of fabrication yield. Broadening the addressing lines reduces the sensitivity to defects, and the use of alternate materials raises the option of reducing the likelihood of crossover shorts. Yet a fourth advantage, specifically for very high pixel density, is that the masking layer is in relatively close proximity to the pixel edge, as opposed to being on the backplane where parallax effects would necessitate an oversized masking line.

Figure 9:
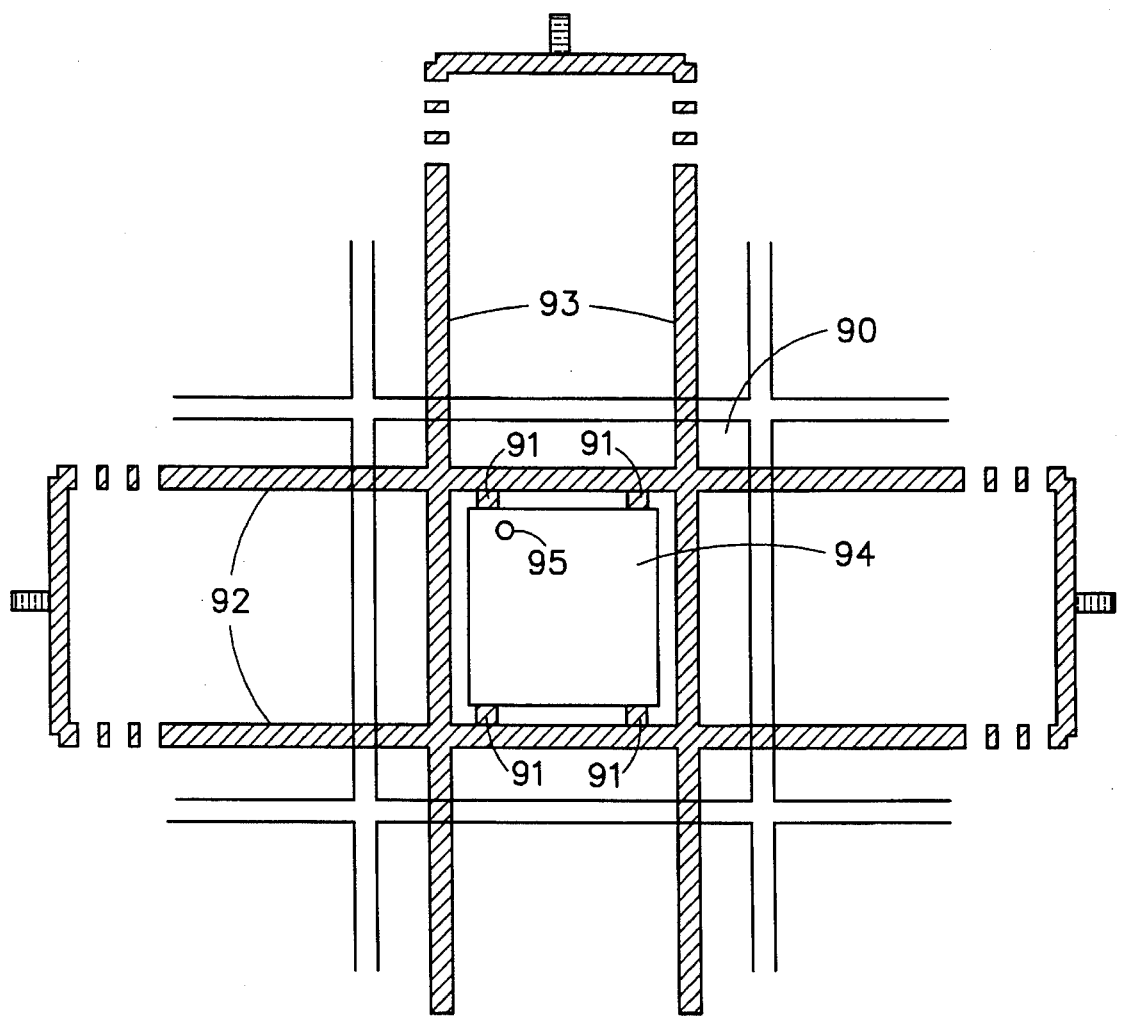
FIG. 9 shows a third embodiment of the present invention.

A third embodiment of the invention is shown in FIG. 9. Here, the buried architecture is used to an advantage in implementing redundancy and making a higher yield process. In an area comparable to that normally covered by the conventional matrix, including black mask, we utilize the buried architecture approach to implement a fully redundant matrix. Each pixel electrode 90 is now driven by four transistors 91, the drain tabs of which are shown in FIG. 9, and with fully redundant row lines 92 and column lines 93. The drain tabs of the transistors are connected to an ITO pad 94 between them. After the insulating planarization layer (not visible from this top view) is applied over the substrate with addressing lines, transistors and ITO pad, a path is made through the planarization layer for the via 95. Pixel electrode 90 is then deposited and patterned onto the planarization layer to complete the pixel definition on the active matrix substrate. Assuming the contactless array architecture discussed previously, high mobility silicon transistors and 2 micron lines, an aperture ratio in excess of 60% is still feasible at 1000 lpi. Similar tradeoffs between redundancy, fabrication tolerances and aperture ratio can be made at other resolutions.

As we have seen, registration of the pixel electrode edges to the underlying active matrix array is generally not critical, except of course for the electrical coupling between the two. In this embodiment, we can see that the via can thus be made anywhere on the ITO pad 94, allowing considerably relaxed tolerances. Alternately, in this or any other embodiment, a capacitive coupling may be configured to eliminate the via entirely, for even simpler processing. In FIG. 9, the coupling may be implemented by the capacitor formed by ITO pad 94, pixel electrode 90 and a suitable dielectric planarization layer between them, excluding the direct via connection 95, and either with or without the redundant elements shown. A variation on the capacitive coupling can further be used to implement prior art half-tone pixel response where the pixel electrode is further segmented, and the capacitive coupling to each segment is adjusted appropriately. Additional elements such as storage capacitors or surface structure below the ITO pad may be added in order to manage the relationships between the LC capacitance, the coupling capacitance(s) and other parasitic capacitances.

The degree of improvement to be gained by moving the pixel electrodes out of the plane of the matrix and extending them to be nearly contiguous is clearly dependent upon the form of the addressing matrix. By nearly contiguous, we mean that the pixel electrodes are close but not touching, and that no additional conductors are between them in the same plane. Extremely high aperture is achieved by implementing very fine design rules, minimizing the number and size of contacts such as ohmic contacts between metal and semiconducting materials, and adopting a self-aligned structure where the TFT is further buried under the gate line, such as described earlier. Other, more conventional and established processes will work also, still resulting in aperture improvements, reliability and yield improvements, or both. While any active matrix compatible semiconductor process can be used, maximum performance at high resolutions will be obtained with high mobility systems, such as polysilicon, recrystallized polysilicon or bonded single crystal silicon.

Figure 10A:
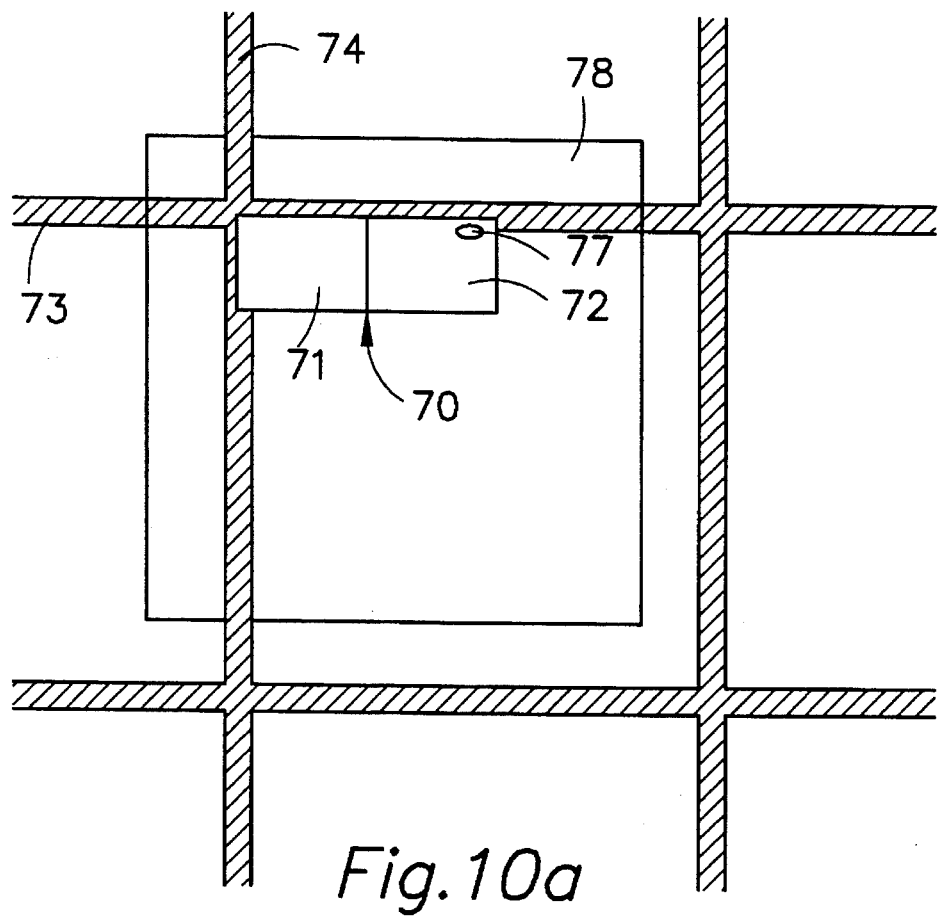
FIGS. 10a and 10b show a fourth embodiment of the present invention.

A fourth embodiment is shown in FIG. 10a. Here, a portion of the useful area freed up by adopting the buried architecture is utilized to incorporate additional circuitry at each pixel. In this embodiment, the active pixel circuit 70 consists of an analog latch 71 and a voltage limiting circuit 72. Electrical coupling to the pixel electrode 78 is achieved by the ohmic or non-ohmic via 77. Pixel voltages are written to the analog latch via address lines 73 and 74 where they are stored with a relatively long hold time. As further seen in FIG. 10b, the alternating polarity drive voltage for the LC cell pixel capacitance 75 is provided by an oscillating square wave voltage 76 applied to the cell backplane, relative to the nominal voltage on addressing line 73. The ramp time of the square wave is controlled so as to control the peak currents through the lines. If desired, an additional voltage reference to source or sink the current to the pixel capacitance can be provided. The voltage limiting circuit 72 controls the maximum voltage to which the pixel capacitance 75 is charged during either the positive or negative portions of the alternating polarity cycle of 76. The voltage limit is controlled on the basis of the latched analog voltage in 71.

Figure 10B:
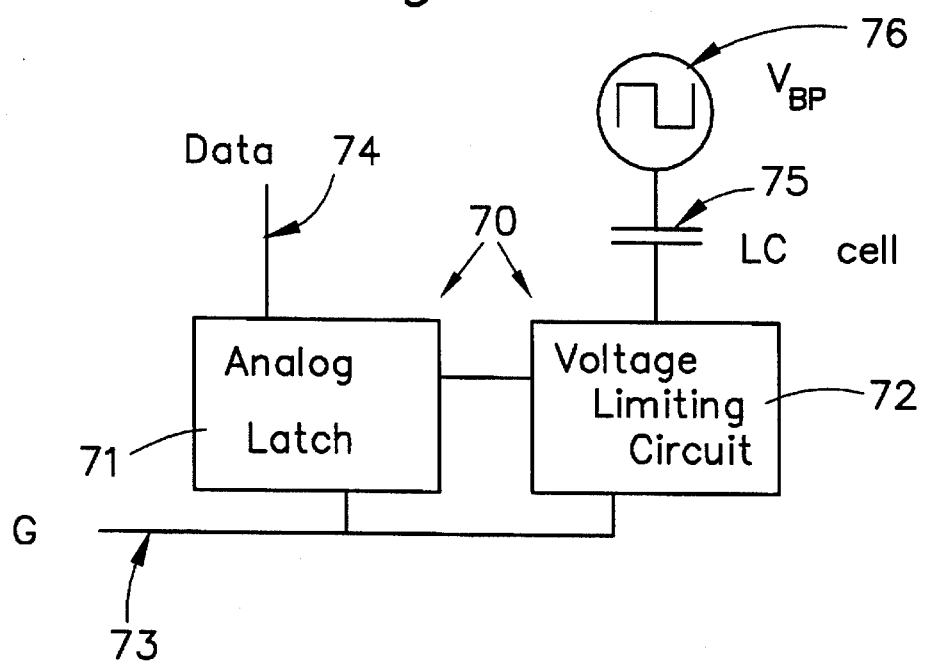

The functional circuit so described is an example of distributed processing, where a portion of the driving methodology is performed at the pixel. In this case, the distributed processing takes the form of an extended latch period and data conversion from dc to ac for driving the LC. While any number of variations may be implemented in the active pixel circuit provided there is sufficient area available, even the relatively simple circuit in FIG. 10b provides quite a number of new display driving options. Rather than using an interleaved approach to average out flicker, the alternation of polarity on the LC can be performed independently of the pixel update frequency. Thus, flicker can be removed by boosting the frequency with which the backplane is driven, for example to 120 Hz or more. This in turn allows us to drive the entire panel with the same polarity at any given time, and eliminates any disclinations or aperture losses which may be associated with other flicker reduction methods. Another clear advantage is the ability to asynchronously update only those regions of the image which are changing. This reduces the bandwidth demands on the driver circuitry, which may grow to be a major factor as displays are made with increasingly higher information density. It also allows regions of the image which are changing rapidly to be updated more often, potentially improving the response time beyond the conventional drive methods. A periodic refresh can be added as necessary to prevent image sag. Yet another benefit is that the voltage holding ratio of the LC becomes less critical, and material resistivity constraints are relaxed.

The concept of implementing such local circuitry is not new, and appropriate circuits may be readily designed by those skilled in the art. However, such pixel circuitry has up to now been impractical in AMLCDs due to lack of space for implementation with reasonable aperture ratio and device yield. When combined with high aperture matrix methods and high mobilities of silicon and polysilicon, however, the buried architecture described herein makes these and other local circuitry approaches practical.

While described thus far in the context of monochrome AMLCD panels, the buried architecture described herein is quite applicable to color systems as well. The first of the four main color methods is spatially combined additive color. These additive systems, particular LCD projectors, which spatially combine the images of three monochrome image sources stand to benefit directly from using these enhanced monochrome devices. The second type, field sequential color systems, may also use this approach directly, provided they are active matrix addressed.

Figure 11:
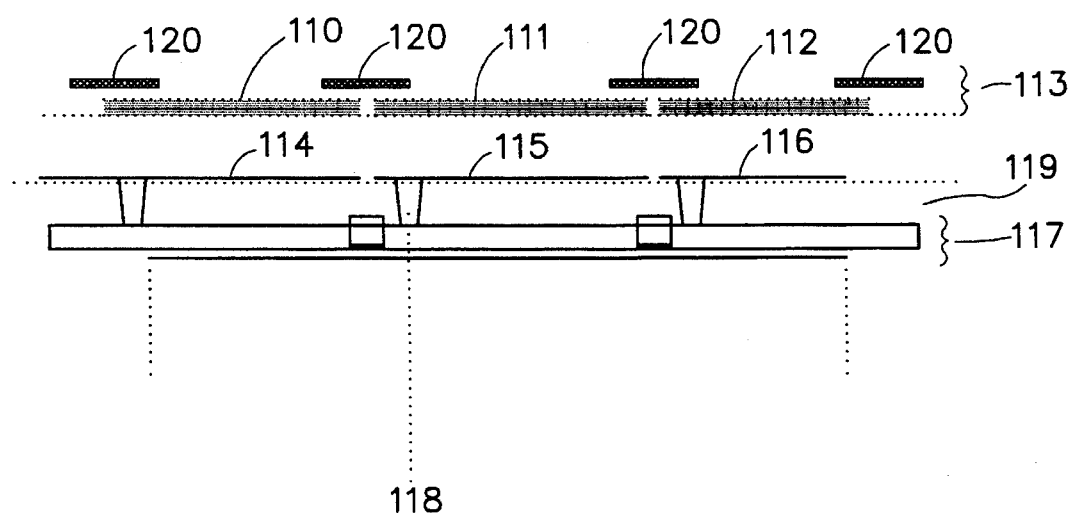
FIG. 11 shows a fifth embodiment of the present invention.

The buried architecture may also be used in the third type of color system, spatially integrated additive color, where color filter arrays are incorporated into the pixel array. This is shown in FIG. 11, and represents a fifth embodiment of the present invention. In this embodiment, red, green and blue color filters, 110, 111 and 112 respectively, are incorporated into the backplane 113 and are aligned with corresponding pixel electrodes 114, 115 and 116. The active matrix array 117 is connected to the pixel electrodes by vias 118 through planarization layer 119 as described in earlier embodiments. Assuming that there may be some spreading, or blooming of a field-on pixel into adjacent pixels, we can anticipate that in the absence of a black masking layer between the colored pixels, a panel may either lose some degree of brightness or purity in the primary colors. Black masking layer 120 has been added to block this overlap region. The degree of black masking to be included at the boundaries between pixels of different colors will be a function of both the operating mode of the display and the color purity requirements. As described earlier, this masking may also take the alternate form of a wide addressing line. In the case of a direct view display, where minimizing the reflectance off the front of the display is critical, both may be used.

The remaining, fourth color method is subtractive color, where light valves are arranged in a stack, with each light valve configured to selectively remove one band of wavelengths from white light incident on the stack. A primary advantage of subtractive color is that full color can be achieved at the addressable resolution of an individual component light valve. This kind of color image source is particularly sensitive to the aperture ratio of the constituent light valves, however. The benefits of the buried architecture approach are particularly important here.

Figure 12A:
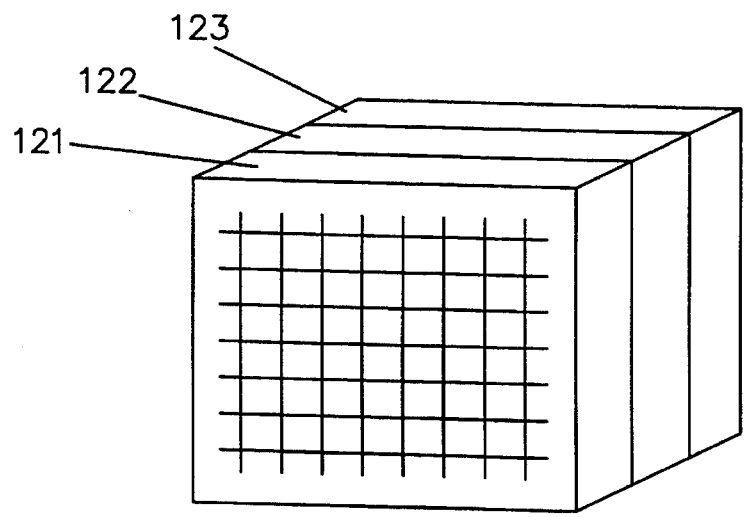
FIGS. 12a and 12b show a sixth embodiment of the present invention.

Shown in FIGS. 12a and 1b is a sixth embodiment which employs subtractive color in a buried architecture. Here, three monochrome AMLCD light valves are arranged into a subtractive color stack. Each light valve is fitted with appropriate wavelength selective polarizers, such that each will modulate a particular color. In the embodiment shown, red, green and blue are modulated by the cyan, magenta and yellow light valves, 121, 122 and 123, as shown. In the limit of high resolution, which for the subtractive color case we can further specify as having a pixel pitch which is significantly smaller than the separation of active layers in adjacent light valves, the transmission efficiency of the triple light valve stack is approximately proportional to the cube of the aperture ratio of each individual light valve. Doubling the aperture ratio, say from 35% to 70%, over the conventional pixel approach thereby yields a factor of 8× improvement in the transmittance of the stack. With high aperture ratios, subtractive color stands to be the most compact and one of the most efficient forms of color AMLCD projection light valves possible.

Figure 12B:
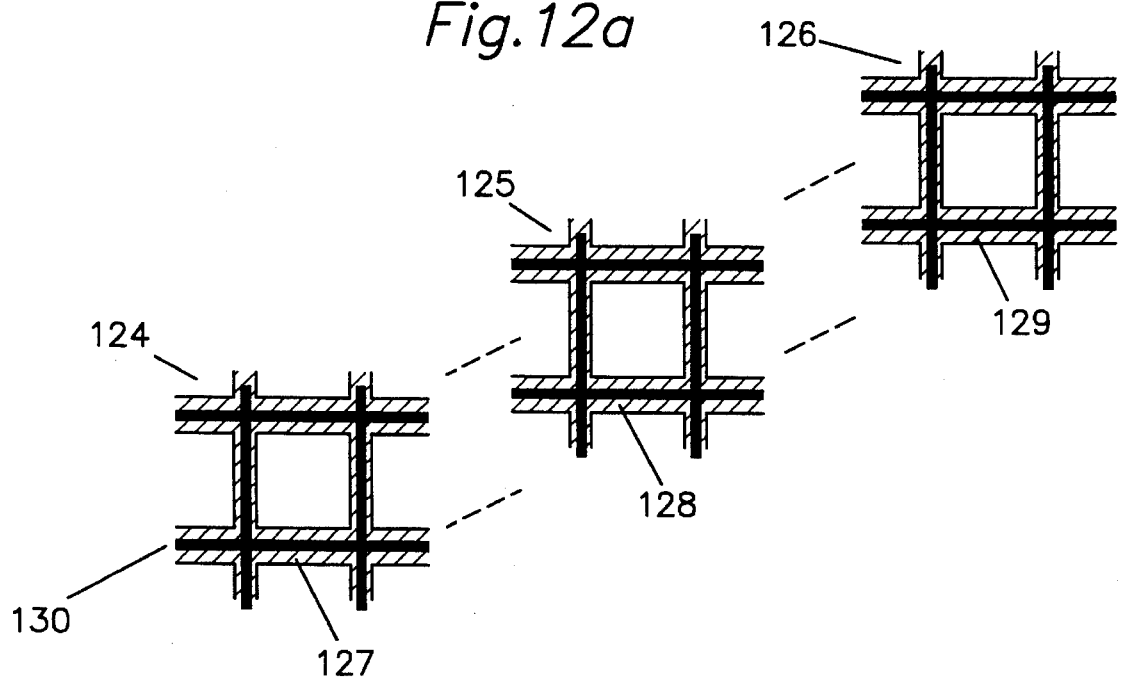

FIG. 12b shows an exploded view of the stacked cyan, magenta and yellow active matrix devices 124, 125 and 126. Included in this embodiment are colored masking layers 127, 128 and 129 to hide the edges of the pixel electrodes, depicted as 130. These masking layers are comparable to the black masking layer described for the monochrome or additive color approaches, and are used if needed to mask any remaining spurious field regions. While black layers could be used here as well, the preferred approach for subtractive color is to make the masking layers out of colored filter materials. Since the goal of the masking layers is to improve the contrast of the light being modulated by the light valve, the masking layers need only block the appropriate color for the light valve they are in. Thus, the cyan light valve 124, which modulates red light, includes cyan masking layer 127 which blocks red light but passes green and blue. Similarly, the magenta light valve 125 includes magenta masking layer 128 and the yellow light valve 126 includes yellow masking layer 129. The net result is that each matrix has two effective aperture ratios—an active aperture ratio, which applies to one color, and a clear aperture ratio, which applies to the other colors passing through the stack. For example, if the opaque structures in each matrix result in an 80% aperture, and the colored matrix layers reduce it to 40% for the selected colors, the transmittance of the stack scales with 80%×80%×40%= 25.6% rather than the $(40\%)^3$=6.4% if a black mask were used. This colored matrix approach to high aperture subtractive color is also applicable to otherwise conventional pixel designs.

Figure 13A:
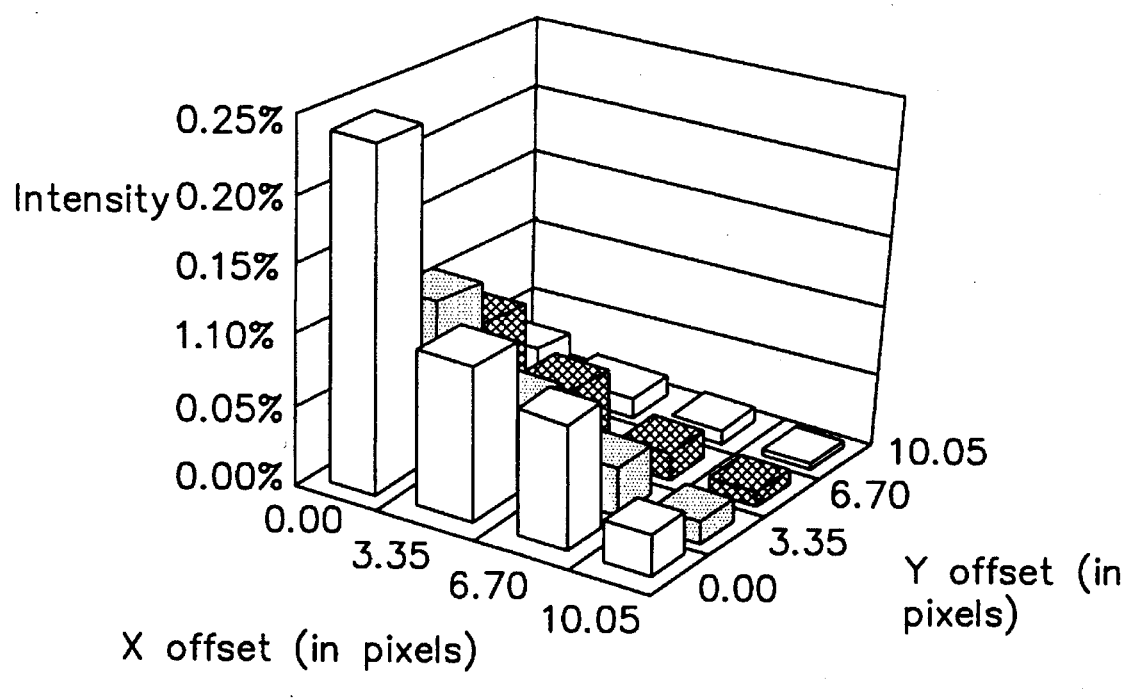
FIG. 13a and 13b depict first order diffractive effects in subtractive color displays.
Figure 13B:
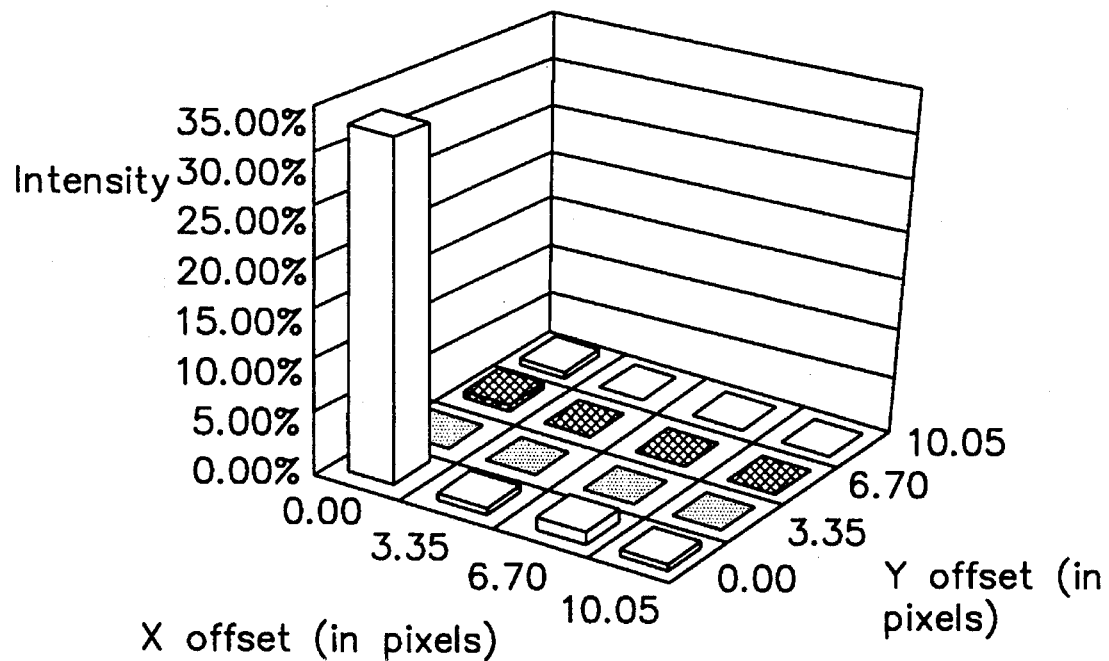

The high aperture ratio afforded by the new architecture and/or the colored matrix carries with it other resolution-enabling features for subtractive color. Due to the situation of imaging pixels through matrix arrays of other pixels, diffractive effects can be severe if the aperture ratio of the intervening structures is low. FIGS. 13a and 13b show a first-order comparison of diffractive effects in two subtractive color systems. The degree of diffractive broadening varies with the position in the stack of the pixels being imaged. The front layer would, of course, not be subject to diffractive broadening since there is no intervening diffracting matrix. In FIGS. 13a and 13b, however, we show the worst case diffraction, namely that encountered in imaging the rear light valve through two light valves in front of it. When viewing a pixel through a matrix structure, the diffraction by the periodic matrix structure broadens the pixel in the form of a two-dimensional series of satellite spots around the center spot. The far-field diffraction model of the relative spot intensities for the rear layer of a 2000 lpi, 30% aperture device is shown in FIG. 13a. The X and Y-offset labels represent how far the satellite spot is from the center spot, in units of pixels. For the 30% aperture and 2000 lpi case modeled in FIG. 13a with a reasonable light valve thickness, we see that significant power is diffracted into spots more than 10 pixels away. Predicted results for a similar device having an 80% aperture ratio, in FIG. 13b, show that in addition to the anticipated factor of 19× improvement in total transmission, the satellite spots have been virtually eliminated compared to the 30% case, increasing the peak intensity in the central spot by a factor of over 100×. Hence it is clear that high aperture ratios are essential to compact subtractive color AMLCD image sources with very high pixel density.

Another potential artifact in high resolution subtractive color AMLCD systems is Moiré-style interference artifacts between the opaque structures in the layers. While methods exist for averaging these Moiré fringes, the most direct way to eliminate them is to increase the aperture of the pixels.

Figure 14:
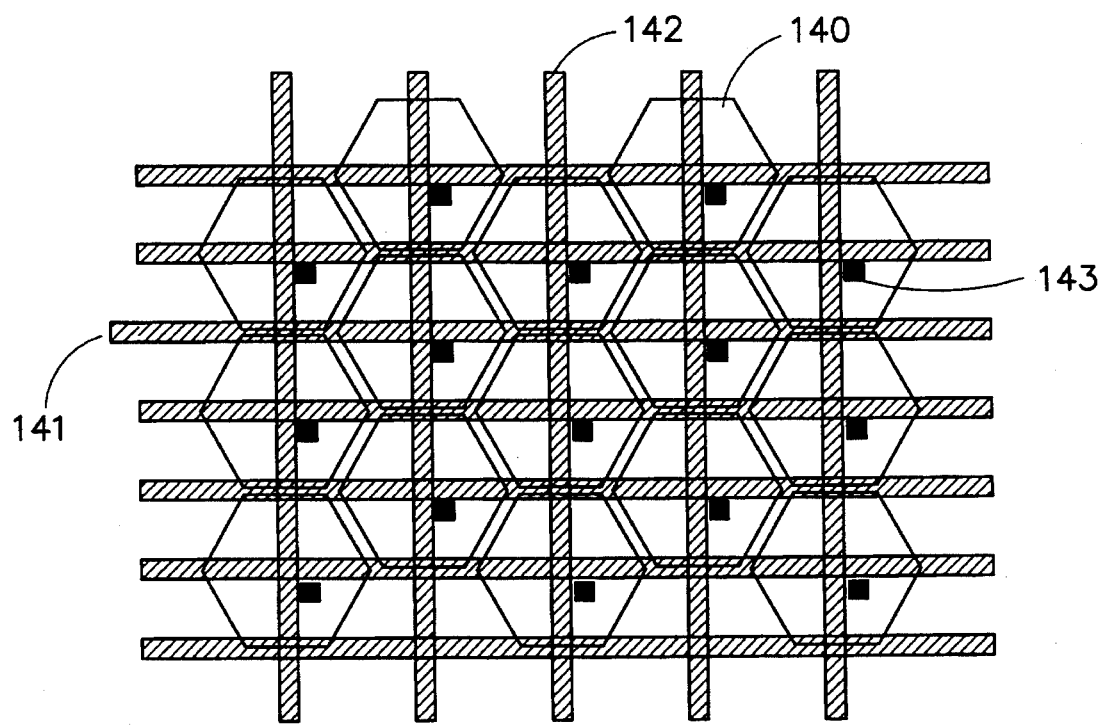
FIG. 14 shows a seventh embodiment of the present invention.

A seventh embodiment, shown in FIG. 14, exemplifies the flexibility inherent in burying the pixel addressing architecture. Rather arbitrary pixel shapes and aspect ratios can be accommodated. Here, a nearly contiguous array of hexagonal pixel electrodes 140 are addressed by a buried matrix of rows 141, columns 142 and TFTs 143. The hexagonal arrangement is interesting from the perspective of sampling theory, in that the spatial frequency capability is more uniformly distributed with orientation. The layout of the rows and columns need not be aligned with the edges of the pixel electrodes, as is clearly demonstrated in this embodiment. Further demonstrated is that the addressing lines can be straight, and hence have lower line resistance than if they followed the zigzag of the pixel electrode edges. In the configuration shown, the rows 141 are more closely spaced than the columns 142. If, for example, integrated source drivers are larger than the gate drivers, the columns could be the source lines, and hence be fewer in number and easier to fit on-pitch. In the case that bandwidth of the source drivers is a primary constraint, then the rows can be the source lines, with a lower driving frequency. The flexible arrangement is easily extended to other pixel patterns, or to provide a high degree of flexibility in the ratio of rows to columns for a given pixel aspect ratio.

Figure 15:
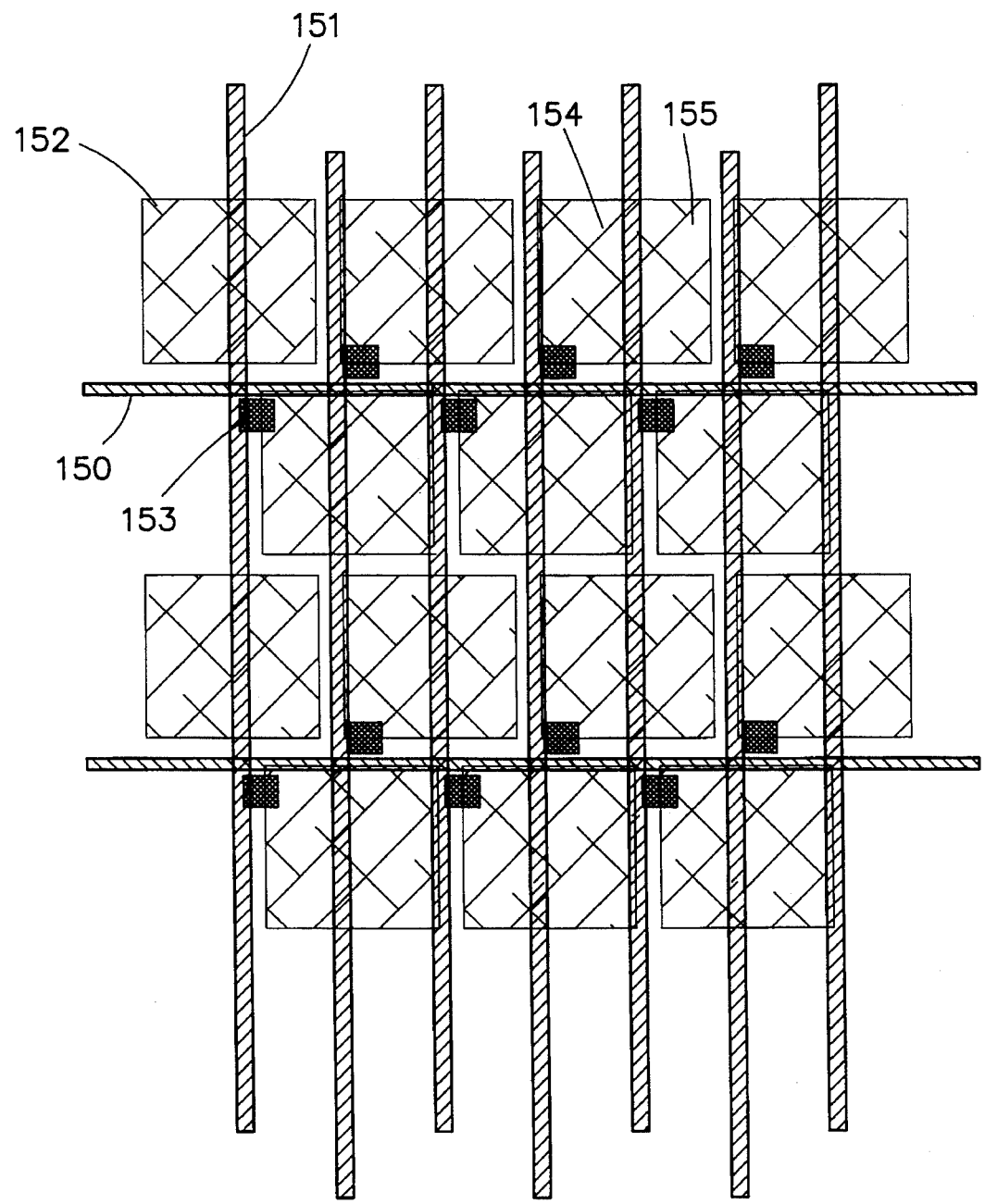
FIG. 15 shows an eighth embodiment of the present invention.

FIG. 15 shows an eighth embodiment, in which this above described flexibility is demonstrated. In FIG. 15, the top view of the pixel array shows a configuration where the pitch of the row addressing lines 150 is four times the pitch of the column addressing lines 151, while retaining a 1:1 pixel aspect ratio. As with the seventh embodiment, each row of pixel electrodes 152 is shown as offset from the previous one, although zero offset could easily be supported as well. Adjacent TFTs 153 along each row line alternate between two rows of pixel electrodes 152, to which they are electrically coupled with by means of vias or capacitive coupling (not shown). The column lines 151 in this case may again serve double duty if desired, providing masking of any contrast limiting artifacts at the edges of the pixels. In addition, the pixels of FIG. 15 are of dual-domain configuration. This can be achieved by methods known to those skilled in the art, and has been shown to improve the viewing angle range of certain LC configurations. One such method is to vary the LC orientational alignment direction spatially. Splitting the pixel in this way, such as depicted by the shading patterns 154 and 155, can give rise to an LC alignment disclination between the pixel halves. The embodiment of FIG. 14 further utilizes the column lines passing through the pixel centers to mask any such disclinations between domains.

As an example of the benefits of the arrangement in FIG. 15, the data drivers, which typically drive the source lines to the TFTs, may be run at a much lower frequency than in a conventional arrangement. Under many circumstances, this reduced bandwidth can carry with it an even more significant reduction in size of the driver circuit, making it easier to fit the drivers (or interconnect to the drivers) on-pitch, despite the shorter pitch. This configuration also allows shared contacts to be implemented along the column addressing lines without substantially decreasing the aperture ratio potential. For each pair of pixels between adjacent row addressing lines, one contact may be placed along the column and evenly spaced between the pair of rows. This allows increased current capability by running a high conductivity metal line in parallel with or in place of the line in a contactless array configuration.

It is readily seen that the arrangement in FIG. 15 could be reconfigured to a nonstaggered geometry, due to the flexibility of allowing lines to pass through (under) essentially any portion of the active area of the pixels with little penalty. The flexibility of the buried architecture can also be applied to configurations in which a subset of the addressing lines are provided on a patterned backplane, such as might be done when utilizing a two-terminal device like a thin film diode as the active pixel circuit.

Figure 16:
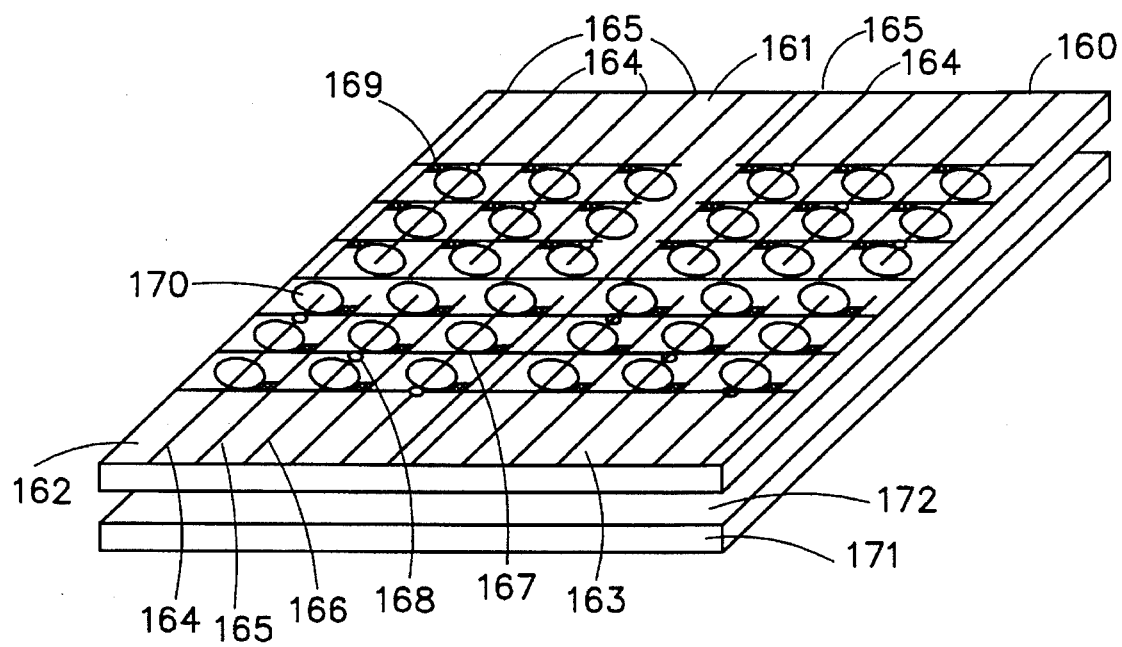
FIG. 16 shows a ninth embodiment of the present invention.

FIG. 16 shows a ninth embodiment, suitable for fabrication of large displays, having high aperture or other desirable properties enabled by the implementation of the buried architecture as described herein. In this embodiment, a large, tiled display panel is constructed from smaller functional pieces, or tiles. Tiling methods allow for the use of fabrication processes and equipment which would otherwise not support the required dimensions, especially with regards to the semiconductor processing. A major difficulty associated with tiling, however, is the sensitivity of observers to minute pixel misalignments between adjacent display sections. Another difficulty is the seaming of electrical connections from tile to tile. These problems are eliminated in the current embodiment by first fabricating active matrix tiles 160 through 163. These tiles are of a size and type supported by the available fabrication process. As shown, the matrix structure of each tile is self-contained, having room for bonded or interconnected drivers (not shown) for both rows 167 and columns 165 situated along the outside edge. The pixel scale is exaggerated for clarity of illustration. Columns 165 are connected directly, and rows 167 are addressed by means of conductive connecting lines 164 situated between the pairs of columns as shown. For example, row line 167 is connected to line 166 at the intersection 168. Each connecting line runs the full length of the columns, such that uniformity is not compromised. Each row line 167 is connected to the corresponding connecting line, thus enabling all drivers to be situated on the perimeter of the tiled display. To complete the active matrix, active pixel circuits 169, including one or more active circuit elements such as thin film transistors, are constructed at the intersections of the rows 167 and columns 165, and an Indium Tin Oxide (ITO) transparent conductive pad 170 is connected to the output of the pixel circuit. As shown, a dielectric insulating layer is required between the connecting lines 164 and the conductive pads 170.

The tiles are then aligned with respect to each other, and the backs of the fabricated tiles are attached to substrate 171 using an appropriate adhesive 172 or other material such as glass frit. Adequate match of height between adjacent panels is achieved through the use of relatively flat substrates, with any thickness mismatch readily compensated for in adhesive layer 172 or the subsequent planarization layer to be applied. The active matrix is now formed on the active matrix substrate.

Once the tiles are in place, completion of the active matrix substrate is achieved as in the embodiment of FIG. 3. An insulating planarization layer is deposited over the tiled active matrix, ITO pixel electrodes are deposited and patterned on the surface of the planarization layer, and connecting vias or capacitive coupling means are provided. Precise registration of the pixel electrodes and the active matrix is unnecessary, with the only requirement being that the connecting vias do not miss the conductive pad 170. Using this method, any slight misregistrations between tiled panels do not result in visible discontinuities, since the pixel electrodes are defined in a single pass. This method does require that certain processing be done on the full, final size substrate, but those processing steps are considerably less demanding than fabrication of the active matrix. Display assembly is completed in a conventional manner, including (not shown) alignment layers, backplane substrate, and LC. Color filters and a black masking layer may be included if desired.

The foregoing is a description of a novel and nonobvious High Aperture AMLCD Architecture. Additional variations and applications of the invention are readily identifiable. The applicant does not intend to limit the invention through the foregoing description, but instead define the invention through the claims appended hereto.

We claim:

1. A transmissive light valve with high aperture architecture constructed through steps comprising:
   providing an active matrix substrate, said substrate manufactured through steps, comprising:
      providing a substrate;
      forming an active matrix addressing means on one side of said substrate, said active matrix addressing means, wherein said active matrix addressing means comprises a plurality of addressing lines, and a plurality of active pixel circuits in electrical connection with the plurality of addressing lines;
      depositing an insulating dielectric layer over said active matrix addressing means;
      depositing a plurality of pixel electrodes which are substantially contiguous and substantially transparent to a range of optical wavelengths, on the opposite side of the insulating layer with respect to said plurality of addressing lines, where a subset of said addressing lines are situated under said pixel electrodes and are aligned in a nonparallel fashion with respect to the edges of said pixel electrodes; and
      establishing an electrical contact between each of said pixel electrodes and a corresponding active pixel circuit;
   positioning an electro-optic medium comprised of liquid crystal proximate to said active matrix substrate, wherein the electro-optic medium is substantially electrically shielded from the plurality of addressing lines by said plurality of pixel electrodes; and
   providing a backplane substrate proximate to said electro-optic medium.

2. The transmissive light valve of claim 1 wherein said electro-optic medium is a liquid crystal.

3. The transmissive light valve of claim 2 wherein the liquid crystal is free of disclinations in the vicinity of a plurality of adjacent pixels having equal applied voltages.

4. The transmissive light valve of claim 1 wherein said plurality of addressing lines comprise both row and column addressing lines.

5. The transmissive light valve of claim 4 wherein said pixel electrodes are arranged in rows and the pixel electrodes in each row are laterally offset from the pixel electrodes in adjacent rows.

6. The transmissive light valve of claim 1 wherein the insulating dielectric layer is in the range of 0.5 microns to 5 microns thick.

7. The transmissive light valve of claim 1 wherein the insulating dielectric layer is a planarization layer deposited over said addressing lines.

8. The transmissive light valve of claim 1 wherein the electrical connection between the plurality of active pixel circuits and the plurality of addressing lines comprise one or more ohmic connections (vias) per pixel electrode.

9. The transmissive light valve of claim 1 wherein the electrical connection between the plurality of active pixel circuits and the plurality of addressing lines comprise one or more non-ohmic connections (vias) per pixel electrode.

10. The transmissive light valve of claim 1 wherein the electrical connection between the plurality of active pixel circuits and the plurality of addressing lines is provided by capacitive coupling means.

11. The transmissive light valve of claim 10, further comprising means for achieving half-tone response from said plurality of pixel electrodes.

12. The transmissive light valve of claim 1 wherein each of said plurality of pixel electrodes is nearly contiguous with a subset of surrounding pixel electrodes.

13. The transmissive light valve of claim 1 wherein a subset of said addressing lines are situated under spaces between said pixel electrodes.

14. The transmissive light valve of claim 1, further comprising light masking means for blocking light near the perimeter of the pixel electrodes.

15. The transmissive light valve of claim 1, wherein said electro-optic medium contains local disinclinations.

16. The transmissive light valve of claim 1 wherein said plurality of active pixel circuits are constructed using high mobility silicon or polysilicon.

17. The transmissive light valve of claim 1 wherein of said pixel electrodes are addressed by redundant addressing lines, and each the redundant addressing lines is laterally offset from one another.

18. The transmissive light valve of claim 1 further comprising a color filter array.

19. The transmissive light valve of claim 1 wherein:

said pixel electrodes are arranged in rows of distinct pixels; and the number of distinct (non-redundant) row addressing lines is substantially different from the number of rows of pixel electrodes.

20. The transmissive light valve of claim 1 wherein each of said plurality of pixel electrodes is nonrectangular in shape.

21. The transmissive light valve of claim 1 further comprising multiple domain alignment of the liquid crystal within each of the pixel electrodes, wherein any disinclinations between domains are masked by said addressing lines.

22. The transmissive light valve of claim 1 wherein all interconnects to the active matrix substrate are located near one edge of said active matrix substrate.

23. The transmissive light valve of claim 1 wherein a plurality of the active matrix substrates are electrically linked to form a tiled transmissive light valve with high aperture architecture.

24. A transmissive active matrix liquid crystal light valve with high aperture architecture, comprising:

an active matrix substrate, comprising:
an insulating layer;
a plurality of addressing lines having shared contacts situated on one side of said insulating layer;
a plurality of pixel electrodes which are nearly contiguous and substantially transparent to a range of optical wavelengths, and situated on the opposite side of the insulating layer with respect to said plurality of addressing lines, where a subset of said addressing lines are situated under said pixel electrodes and are aligned in a nonparallel fashion with respect to the edges of said pixel electrodes;
a plurality of active pixel circuits in electrical connection with the plurality of addressing lines, where each of said active pixel circuits corresponds to one of the plurality of pixel electrodes; and
electrical coupling means between said pixel electrodes and corresponding active pixel circuits;
an electro-optic medium comprised of liquid crystal proximate to said active matrix substrate, wherein the electro-optic medium is substantially electrically shielded from the plurality of addressing lines by said plurality of pixel electrodes; and
a backplane substrate proximate to said electro-optic medium.

25. The transmissive active matrix liquid crystal light valve of claim 24 wherein all of said shared contacts are external to an area containing said pixel electrodes.

26. The transmissive active matrix liquid crystal light valve of claim 24 wherein said active pixel circuits are comprised of thin film transistors, and said thin film transistors are substantially buried beneath the addressing lines.

27. A transmissive active matrix liquid crystal light valve with high aperture architecture, comprising:

an active matrix substrate, comprising:
an insulating layer;
a plurality of addressing lines situated on one side of said insulating layer;
a plurality of pixel electrodes which are nearly contiguous and substantially transparent to a range of optical wavelengths, and situated on the opposite side of the insulating layer with respect to said plurality of addressing lines;
a plurality of active pixel circuits each comprised of an analog latch circuit and a voltage limiting circuit where an oscillating voltage is applied to said backplane such that an alternating voltage is applied across the electro-optic medium, the amplitude of said alternating voltage being controlled by said analog latching circuit, said plurality of active pixel circuits are in electrical connection with the plurality of addressing lines, where each of said active pixel circuits corresponds to one of the plurality of pixel electrodes and each active pixel circuit contains a plurality of active circuit elements; and
electrical coupling means between said pixel electrodes and corresponding active pixel circuits;
an electro-optic medium comprised of liquid crystal proximate to said active matrix substrate, wherein the electro-optic medium is substantially electrically shielded from the plurality of addressing lines by said plurality of pixel electrodes; and
a backplane substrate proximate to said electro-optic medium.

28. The transmissive active matrix liquid crystal light valve of claim 27 wherein said plurality of active circuit elements contained within each of said active pixel circuits, acts in a redundant fashion.

29. The transmissive active matrix liquid crystal light valve of claim 27 wherein distributed processing is performed by each of the active pixel circuits.

30. The transmissive active matrix liquid crystal light valve of claim 29 wherein said distributed processing comprises data conversion at the pixel.

31. The transmissive active matrix liquid crystal light valve of claim 30 wherein the electro-optic medium is a nematic liquid crystal.

32. The transmissive active matrix liquid crystal light valve of claim 29 wherein sets of said active pixel circuits may be updated asynchronously.

33. The transmissive active matrix liquid crystal light valve of claim 27 wherein said alternating voltage is at a frequency sufficiently high so as to eliminate the perception of flicker.

34. The transmissive active matrix liquid crystal light valve of claim 32 wherein said frequency is greater than or equal to 120 Hz.

35. A transmissive subtractive color active matrix liquid crystal light valve stack with high aperture architecture, comprising:
- a plurality of stacked active matrix liquid crystal light valves, where each of said active matrix liquid crystal light valves selectively modulates a range of optical wavelengths and the ranges of the optical wavelengths are substantially non-overlapping, each of said light valves is comprised of:
  - an active matrix substrate, comprising:
    - an insulating layer;
    - a plurality of addressing lines situated on one side of said insulating layer;
    - a plurality of pixel electrodes substantially transparent to a range of optical wavelengths, and situated on the opposite side of the insulating layer with respect to said plurality of addressing lines, where a subset of said addressing lines are situated under said pixel electrodes and are aligned in a nonparallel fashion with respect to the edges of said pixel electrodes;
  - a plurality of active pixel circuits in electrical connection with the plurality of addressing lines, where each of said active pixel circuits corresponds to one of the plurality of pixel electrodes; and
  - electrical coupling means between said pixel electrodes and corresponding active pixel circuits;
  - an electro-optic medium comprised of liquid crystal proximate to said active matrix substrate, wherein the electro-optic medium is substantially electrically shielded from the plurality of addressing lines by said plurality of pixel electrodes; and
  - a backplane substrate proximate to said electro-optic medium.

36. The transmissive subtractive color active matrix liquid crystal light valve stack of claim 35, further comprising light masking layers in one or more of the active matrix liquid crystal light valves, where each of said light masking layers selectively blocks the range of optical wavelengths modulated by the active matrix liquid crystal light valves containing the light masking layer while transmitting the ranges of optical wavelengths modulated by the other active matrix liquid crystal light valves.

* * * * *